United States Patent
Popuri et al.

(10) Patent No.: US 10,509,667 B1
(45) Date of Patent: Dec. 17, 2019

(54) MODELING SPACE CONSUMPTION OF A MIGRATED VM

(71) Applicant: Tintri by DDN, Inc., Santa Clara, CA (US)

(72) Inventors: Siva Popuri, Mountain View, CA (US); Mark G. Gritter, Eagan, MN (US)

(73) Assignee: Tintri by DDN, Inc., Santa Clara, CA (US)

( * ) Notice: Subject to any disclaimer, the term of this patent is extended or adjusted under 35 U.S.C. 154(b) by 121 days.

(21) Appl. No.: 15/693,249

(22) Filed: Aug. 31, 2017

Related U.S. Application Data

(60) Provisional application No. 62/448,253, filed on Jan. 19, 2017.

(51) Int. Cl.
    *G06F 9/455* (2018.01)

(52) U.S. Cl.
    CPC .. *G06F 9/45558* (2013.01); *G06F 2009/4557* (2013.01)

(58) Field of Classification Search
    CPC .................................................. G06F 9/45558
    See application file for complete search history.

(56) References Cited

U.S. PATENT DOCUMENTS

| 6,314,465 | B1 | 11/2001 | Paul |
| 9,135,033 | B1 | 9/2015 | Lee |
| 2011/0010514 | A1 | 1/2011 | Benhase |
| 2012/0036327 | A1 | 2/2012 | Jennas, II |
| 2012/0185851 | A1 * | 7/2012 | Zhang ............... G06F 9/5083 718/1 |
| 2012/0272237 | A1 * | 10/2012 | Baron ............... G06F 9/45558 718/1 |
| 2013/0097601 | A1 | 4/2013 | Podvratnik |
| 2013/0238780 | A1 | 9/2013 | Devarakonda |
| 2014/0250439 | A1 * | 9/2014 | Parashar ............ G06F 9/5083 718/104 |
| 2016/0070601 | A1 | 3/2016 | Yamamoto |
| 2016/0070602 | A1 | 3/2016 | Shimogawa |
| 2017/0060611 | A1 | 3/2017 | Birkestrand |
| 2018/0139100 | A1 | 5/2018 | Nagpal |

OTHER PUBLICATIONS

Jianhai et al, Affinity-Aware Grouping for Allocation of Virtual Machines, 2013, 2013 IEEE 27th International Conference on Advanced Information Networking and Applications, pp. 235-242 (Year: 2013).

* cited by examiner

*Primary Examiner* — Hang Pan
(74) *Attorney, Agent, or Firm* — Van Pelt, Yi & James LLP

(57) ABSTRACT

Modeling space consumption of a migrated VM is disclosed, including: obtaining aggregated effective historical space usage data associated with a plurality of VMs at a storage device; using the aggregated effective historical space usage data to generate one or more predicted metrics of space usage at the storage device; and using the one or more predicted metrics of space usage to potentially migrate a VM with respect to the storage device.

15 Claims, 18 Drawing Sheets

| 0 | 1 | 2 | 3 | 4 | 5 | 6 | 7 | 8 | 9 | 10 | 11 | 12 |
|---|---|---|---|---|---|---|---|---|---|---|---|---|
| Combined space usage related Metric 1 | Combined space usage related Metric 2 | Combined space usage related Metric 3 | Combined protection policy violated Metric 4 | Combined QoS related Metric 5 | Combined access rate related Metric 6 | Combined access rate related Metric 7 | Combined load related Metric 8 | Combined load related Metric 9 | Combined space usage related Metric 10 | Combined access rate related Metric 11 | Combined space usage related Metric 12 | Combined load related Metric 13 |

Highest Priority → Lowest Priority

1500

FIG. 15

MODELING SPACE CONSUMPTION OF A MIGRATED VM

CROSS REFERENCE TO OTHER APPLICATIONS

This application claims priority to U.S. Provisional Patent Application No. 62/448,253 entitled MODELING SPACE CONSUMPTION OF A MIGRATED VM filed Jan. 19, 2017 which is incorporated herein by reference for all purposes.

BACKGROUND OF THE INVENTION

Storage devices that store data typically react to mitigate the effects of undesirable events after detecting the occurrence of such undesirable events. An example of an undesirable event may include the usage of a threshold percentage of storage space at a storage device. However, even if the effects of an undesirable event may be improved by a subsequent action (e.g., the migration of some files away from the storage device at which the undesirable event has occurred), the storage device may still suffer lowered performance for at least a period of time.

BRIEF DESCRIPTION OF THE DRAWINGS

Various embodiments of the invention are disclosed in the following detailed description and the accompanying drawings.

FIG. 15 is a diagram showing a combined predicted metric data structure.

DETAILED DESCRIPTION

Figure 1:
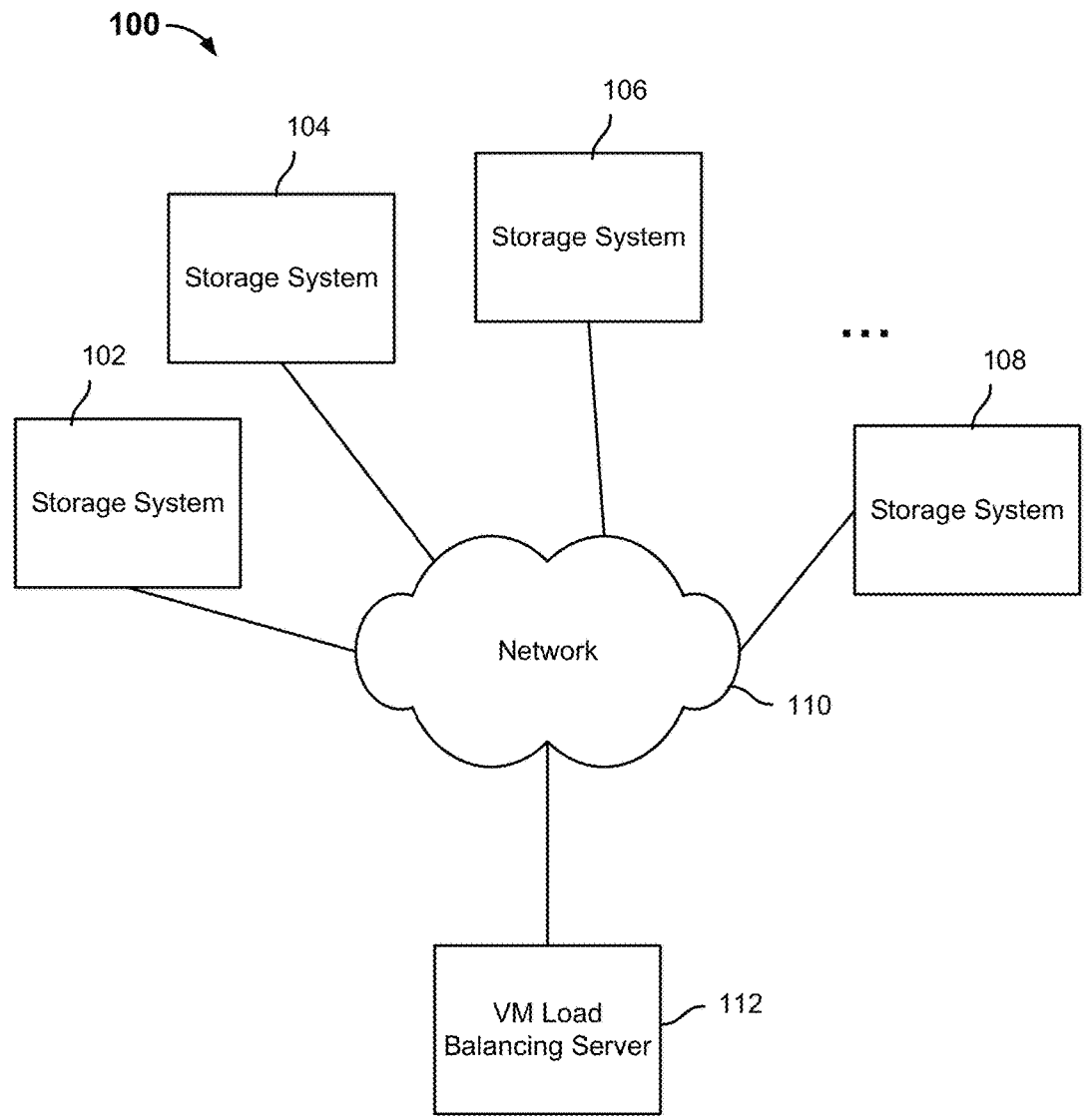
FIG. 1 is a diagram showing an embodiment of a system for performing load balancing using predictive analytics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of predicting storage space usage at a storage device are described herein. In various embodiments, effective historical space usage data associated with a plurality of virtual machines (VMs) at a storage device is obtained. In various embodiments, "effective historical space usage data" refers to historical space usage data of the VMs that are currently residing at the storage device. Put another way, "effective historical space usage data" includes historical space usage data associated with VM(s) that have been added to the storage device from a different source storage device and also excludes the historical space usage data associated with VM(s) that have been moved from the storage device to a different storage device. In various embodiments, the effective historical space usage data is used to generate one or more predicted metrics of space usage at the storage device.

In some embodiments, a storage device is included with at least one other storage device in a "pool" of storage devices. Storage devices that are included in the same pool may have at least one common attribute (e.g., the storage devices are located in the same geographic area). A storage device specific predicted metric data structure is determined for each storage device, where at least some of the predicted metrics of the data structure are associated with the space usage at each storage device, and then the device specific predicted metric data structures corresponding to the storage devices that are associated with the same pool are combined to determine a combined, pool-level predicted metric data structure. In various embodiments, a "predicted metric" comprises a probability that a particular event, which is sometimes referred to as a "metric type," may occur at any point within a window of time in the future. A predicted metric may comprise a probability that is a single value or a range of probabilities. For example, a metric type may comprise an undesirable event across one or more storage devices. In some embodiments, the predicted space usage as a result of moving a VM off of the storage device is used to determine whether the VM should be moved off the storage device in a load balancing process that attempts to improve at least one predicted metric of the combined, pool-level predicted metric data structure. In some embodiments, the predicted space usage as a result of moving a VM off of the storage device is used to determine whether the VM should be moved off the storage device in a load balancing process that attempts to improve at least one predicted metric of the combined, pool-level predicted metric data structure. Similarly, in some embodiments, the predicted space usage as a result of moving a VM onto the storage device is used to determine whether the VM should be moved onto the storage device in a load balancing process that attempts to improve at least one predicted metric of the combined, pool-level predicted metric data structure. In some embodiments, the predicted space usage as a result of moving a VM onto the storage device is used to determine whether the VM should be moved onto the storage device in a load balancing process that attempts to improve at least one predicted metric of the combined, pool-level predicted metric data structure.

FIG. 1 is a diagram showing an embodiment of a system for performing load balancing using predictive analytics. In the example, system 100 includes storage device 102, storage device 104, storage device 106, network 110, storage device 108, and VM load balancing server 112. In various embodiments, network 110 includes various high-speed data networks and/or telecommunications networks. In various embodiments, system 100 includes storage device 102, storage device 104, storage device 106, storage device 108, and VM load balancing server 112 communicate with each other over network 110. In the example, each of storage device 102, storage device 104, storage device 106, and storage device 108 store data related to one or more VMs for which data is currently stored on the respective storage device. Each of storage device 102, storage device 104, storage device 106, and storage device 108 is configured to store historical data at different historical points in time with respect to the VMs that are currently and/or have previously resided at that storage device. In some embodiments, VM load balancing server 112 is configured to keep track of which VMs currently reside at which storage device. In some embodiments, a VM may have data stored at different storage devices and are referred to as "multi-component VMs." In some embodiments, VM load balancing server 112 is configured to store aggregated historical data associated with a multiple-component VM.

At least two of storage device 102, storage device 104, storage device 106, and storage device 108 may be defined by a user to be included in the same pool of storage devices. In various embodiments, a pool of storage devices comprises storage devices that share at least one common attribute (e.g., are located with the same geographic area and/or are owned by the same entity). VM load balancing server 112 is configured to obtain historical data corresponding to various VMs from the storage devices at which the VMs reside and use the historical data to generate predicted metrics for each storage device based on the historical VM data obtained from that storage device. In various embodiments, a "predicted metric" comprises a probability that a particular event, which is sometimes referred to as a "metric type," may occur at any point within a window of time in the future. A predicted metric may comprise a probability that is a single value or a range of probabilities. For example, a metric type may comprise an undesirable event across one or more storage devices and/or an event that is to trigger load balancing of VMs among storage devices of the pool. For example, the historical VM data from the past 30 days may be used to generate a metric within the subsequent seven days. In various embodiments, a user configurable/tunable historical window of time associated with historical VM data may be used to make a predicted metric within a user configurable/tunable future window of time. VM load balancing server 112 is configured to include the predicted metrics generated for each storage device into a data structure that corresponds to that storage device. In some embodiments, the data structure is a vector. In various embodiments, VM load balancing server 112 is configured to include the predicted metrics generated for each storage device into a corresponding data structure such that the position of each predicted metric corresponds to a priority associated with that particular metric type. For example, the predicted metric associated with the highest priority metric type is stored in the first position in the vector, the predicted metric associated with the second highest priority metric type is stored in the second position in the vector, and so forth.

After VM load balancing server 112 has generated a storage device specific predicted metric data structure for each storage device in a pool, VM load balancing server 112 is configured to combine the storage device specific predicted metric data structures associated with the storage devices in the pool into a combined, pool-level predicted metric data structure. For example, storage device 102, storage device 104, storage device 106, and storage device 108 are included in the same pool and so VM load balancing server 112 has generated a storage device specific predicted metric data structure corresponding to each of storage device 102, storage device 104, storage device 106, and storage device 108. Then, VM load balancing server 112 is configured to combine the storage device specific predicted metric data structure corresponding to each of storage device 102, storage device 104, storage device 106, and storage device 108 together to determine a combined, pool-level predicted metric data structure. In various embodiments, combining the storage device specific predicted metric data structures associated with the storage devices in the pool into the combined, pool-level predicted metric data structure includes determining the joint probability of all predicted metrics associated with the same metric type across the storage device specific predicted metric data structures as the combined, pool-level predicted metric for the same metric type. As such, each combined predicted metric of the combined predicted metric data structure represents the predicted probability that the event of the corresponding metric type will happen at any point to any storage device in the pool in a configured window of time in the future.

VM load balancing server 112 will identify one or more predicted metrics within the combined predicted metric data structure that are to be improved. In various embodiments, one or more predicted metrics are determined to be improved by comparing those values to one or more respective threshold values. Similar to predicted metrics, a threshold value can either be a single value or a range of values. For example, if a combined predicted metric is greater than a threshold value associated with the corresponding metric type, then the combined predicted metric is determined to be improved. For example, the combined predicted metric that is to be improved may be a probability (e.g., 78%) that any storage device in the pool is to exceed 98% of its space capacity in the next seven days (e.g., or whichever user configured window of time in the future) exceeding a corresponding threshold value (e.g., 70%).

VM load balancing server 112 is configured to use each combined, pool-level predicted metric that is identified to be improved to select one or more VMs to move/migrate from their current/source storage devices within the pool to a different destination storage device within the pool. Moving the one or more VMs from their current/source storage devices within the pool to a different destination storage device within the pool is predicted to improve at least the identified combined, pool-level predicted metric that is identified to be improved. In the event that a combined, pool-level predicted metric is defined to be a probability that an undesirable event will happen to any storage device within the pool at any time in a configured window of time in the future, "improving" that combined predicted metric includes lowering the probability that the undesirable event will happen (e.g., to be below the threshold value corresponding to that metric type). In various embodiments, it is predicted that moving the one or more VMs from their current/source storage devices within the pool to a different destination storage device within the pool will improve the identified combined, pool-level predicted metric that is identified to be improved based on computing an updated combined, pool-level predicted metric data structure based on a hypothetical ("what-if") scenario in which the historical data of the one or more VMs are removed from their current/source storage device and instead assumed to be already stored at the destination storage device. In some embodiments, VM load balancing server 112 is configured to determine one or more sets of VMs to move to respective destination storage devices within the pool to potentially improve each combined, pool-level predicted metric that is selected to be improved. In some embodiments, VM load balancing server 112 is configured to present the determined sets of VMs and their respective destination storage devices the sets of VMs are determined to move to as one or more recommendations for a user to approve. For example, each recommendation identifies which VMs to move, the source storage devices of the VMs, the destination storage devices of the VMs, and the metric type that the VM migrations are predicted to improve. In response to a user selection to approve a recommendation, VM load balancing server 112 is configured to initiate the migration of the data of the VMs included in the recommendation from their respective source storage device(s) to their destination storage device. In some embodiments, a recommendation may be automatically implemented without any user input/approval. In some embodiments, the actual migration of VM data from one storage device to another may be performed by a hypervisor and/or the source storage device and/or the destination storage device.

In some embodiments, after a recommendation is implemented (i.e., VMs included in the recommendation are migrated between storage devices in the pool), the historical data associated with migrated VMs will be removed from their former/source storage devices and then added to the aggregated historical VM data of their current/destination storage devices such that subsequently generated predicted metrics may be computed based on historical data of only VMs that are actually residing at each storage device. In various embodiments, "aggregated historical VM data" refers to the combination (e.g., sum or other combination) of historical data across one or more VMs that reside at a storage device. In various embodiments, the modified historical data of VMs stored at a storage device is referred to as the "effective" historical data (as opposed to "actual" historical data, which refers to historical data associated with even VMs that do not currently reside at a certain storage device). As such and as will be described in further details below, the aggregated historical data of VMs that is stored at each storage device and used for making predicted metrics comprises aggregated "effective" historical data.

Figure 2:
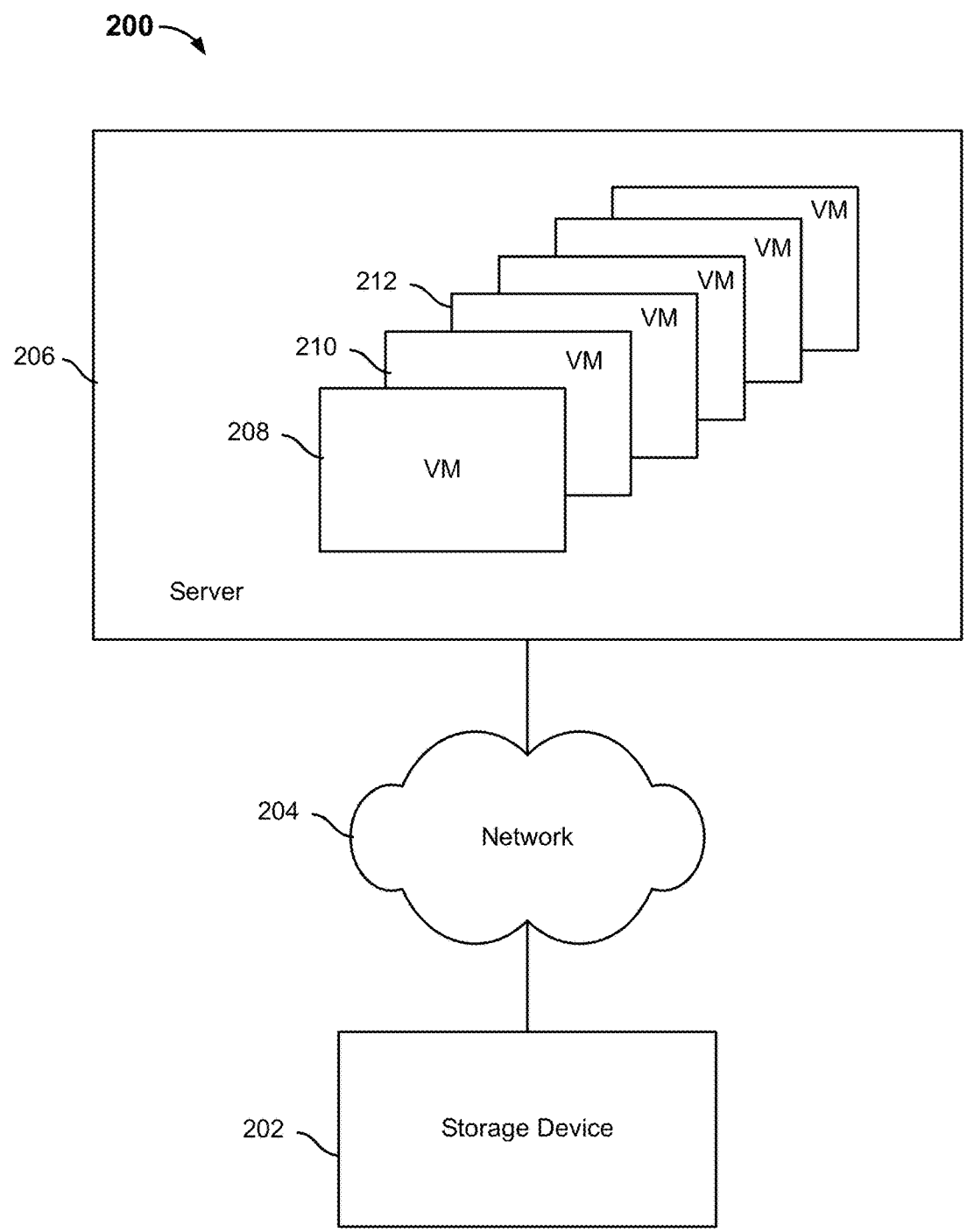
FIG. 2 is a diagram showing an embodiment of a storage device for the storage of VMs using virtual machine storage abstractions.

FIG. 2 is a diagram showing an embodiment of a storage device for the storage of VMs using virtual machine storage abstractions. In the example shown, system 200 includes server 206, network 204, and storage device 202. In various embodiments, network 204 includes various high-speed data networks and/or telecommunications networks. In some embodiments, storage device 202 communicates with server 206 via network 204. In some embodiments, the file system for the storage of VMs using VM storage abstractions does not include network 204, and storage device 202 is a component of server 206. In some embodiments, server 206 is configured to communicate with more storage systems other than storage device 202. Each of storage devices 102, 104, 106, and 108 of system 100 of FIG. 1 may be implemented using a storage device such as storage device 202 of system 200.

In various embodiments, server 206 runs several VMs. In the example shown, VMs 208, 210, and 212 (and other VMs) are running on server 206. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating the system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage device as one or more files. In various embodiments, the files are examples of VM storage abstractions. In some embodiments, the respective files associated with (at least) VMs 208, 210, and 212 running on server 206 are stored on storage device 202.

In various embodiments, storage device 202 is configured to store meta-information identifying which stored data objects, such as files or other VM storage abstractions, are associated with which VM or vdisk. In various embodiments, storage device 202 stores the data of VMs running on server 206 and also stores the metadata that provides mapping or other identification of which data objects are associated with which specific VMs. In various embodiments, mapping or identification of specific VMs includes mapping to the files on the storage that are associated with each specific VM. In various embodiments, storage device 202 also stores at least a portion of the files associated with the specific VMs in addition to the mappings to those files. In various embodiments, storage device 202 refers to one or more physical systems and/or associated hardware and/or software components configured to work together to store and manage stored data, such as files or other stored data objects. In some embodiments, a hardware component that is used to (at least in part) implement the storage device may be comprised of one or a combination of multiple tiers of storage types. For example, storage device 202 may include tiers of storage types such as hard disk drive (HDD or "disk") and/or solid state drive (SSD or "flash"). In various embodiments, a type of storage is considered to be in a higher tier if it has faster accesses relative to a type of storage that is considered to be in a lower tier. In various embodiments, the higher tier type of storage (e.g., flash storage) at storage device 202 is configured to store more frequently accessed and/or otherwise higher priority VM data and lower tier type of storage (e.g., disk storage) at storage device 202 is configured to store less frequently accessed and/or otherwise lower priority VM data.

Figure 3:
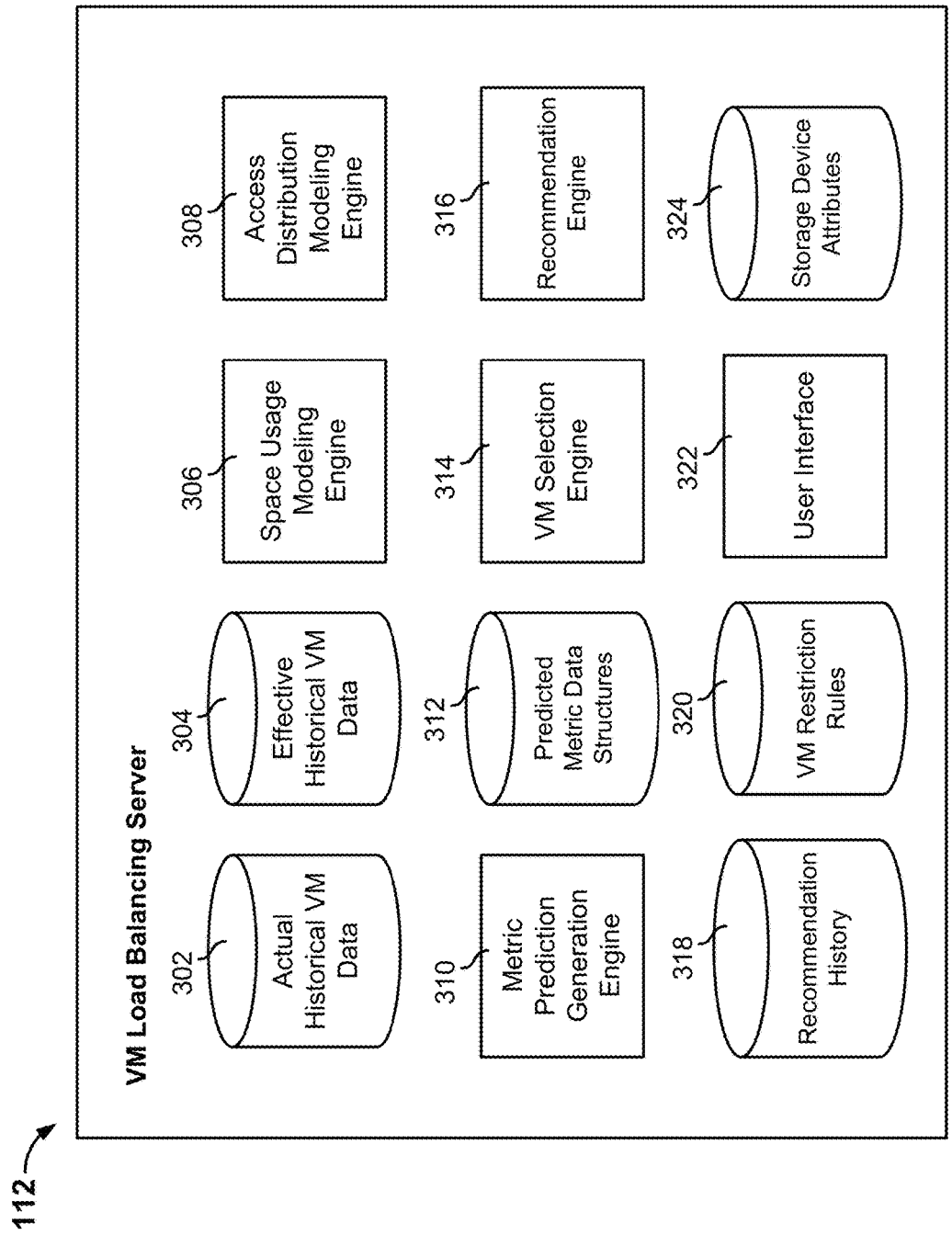
FIG. 3 is a diagram showing an example of a VM load balancing server.

FIG. 3 is a diagram showing an example of a VM load balancing server. In the example VM load balancing server of FIG. 3, the VM load balancing server includes actual historical VM data storage 302, effective historical VM data storage 304, space usage modeling engine 306, access distribution modeling engine 308, metric prediction generation engine 310, predicted metric data structures storage 312, VM selection engine 314, recommendation engine 316, recommendation history storage 318, VM restriction rules storage 320, user interface 322, and storage device attributes 324. In some embodiments, space usage modeling engine 306, access distribution modeling engine 308, metric prediction generation engine 310, VM selection engine 314, recommendation engine 316, and user interface 322 may each be implemented using one or both of hardware and/or software. In some embodiments, actual historical VM data storage 302, effective historical VM data storage 304, predicted metric data structures storage 312, recommendation history storage 318, VM restriction rules storage 320, and storage device attributes 324 may be implemented using one or more databases. In various embodiments, a VM load balancing server may include additional, fewer, and/or different components than those described in FIG. 3.

Actual historical VM data storage 302 is configured to store the actual historical VM data of VMs that have previously resided and/or currently reside on a storage device. In various embodiments, the VM load balancing server is configured to generate predicted metrics for storage devices in a pool and then to generate recommendations of which sets of VMs to move from their source storage devices to a destination storage device within the same pool in order to improve a combined, pool-level predicted metric. Examples of actual historical VM data comprise performance attributes (e.g., storage space usage and load), how much of a VM's data is stored in disk versus flash, and/or how many times each VM's block in disk/flash has been accessed. In some embodiments, actual historical VM data storage 302 is configured to store, for each VM, a historical attribute value at each predetermined historical interval for a predetermined length of time. An example historical attribute value is space usage and as such, actual historical VM data storage 302 may store a space usage attribute value corresponding to how much space each VM at the storage device at which it is residing consumes on each day of a window of time in the past. In some embodiments, if a VM has data that is stored across multiple storage devices, then actual historical VM data storage 302 is configured to store the aggregated historical attribute value of the multi-component VMs across the multiple storage devices at each predetermined historical interval for a predetermined length of time. In some embodiments, at least some of the actual historical VM data corresponding to a VM is also stored at each storage device that stores data of that VM.

Effective historical VM data storage 304 is configured to store the effective historical data of VMs that currently reside on a storage device. Examples of effective historical VM data comprise performance attributes (e.g., storage space usage and load) and also how much of a VM's data is stored in disk versus flash and/or how many times each VM's block in disk/flash has been accessed. As mentioned above, after a VM is moved from its source storage device to a destination storage device (e.g., as a result of a user approving a recommendation that includes such a move), the effective historical VM data at each of the source storage device and the destination storage device is updated. At the source storage device, the historical VM data of the migrated VM is removed. For example, if "VM-123" had been moved off of a source storage device and the source storage device had stored a historical space usage attribute value corresponding to "VM-123" at each predetermined historical interval (e.g., day) for a predetermined length of time (e.g., at least 30 days), then the historical space usage attribute value corresponding to "VM-123" would either be discarded from the source storage device or at least indicated to be ignored in making predicted metrics for the source storage device. Similarly, for example, the historical space usage attribute value corresponding to "VM-123" at each predetermined historical interval (e.g., day) for a predetermined length of time that was previously stored at the former source storage device is then added to the destination/current storage device. The purpose of updating the effective historical VM data at the source and destination storage devices after a VM migration is so that the updated effective historical VM data at each storage device could accurately reflect the historical data of VMs that currently reside on the storage device (and not that of VMs that no longer currently reside on the storage device). As such, the effective historical VM data at a storage device may be used to make accurate predicted metrics for the storage device. In some embodiments, at least some of the effective historical VM data corresponding to a VM is also stored at each storage device on which the VM resides.

Space usage modeling engine 306 is configured to generate predicted metrics related to space usage related metric types. In some embodiments, space usage modeling engine 306 is configured to input the effective historical VM data related to space usage at each storage device (e.g., how much aggregated storage space one or more VMs that currently reside at the storage device consume) (e.g., that is stored either at the storage device and/or at effective historical VM data storage 304) from a configured historical window of time (e.g., the past 30 days) into one or more statistical models. In some embodiments, space usage modeling engine 306 is configured to input historical non-VM data related to space usage at each storage device from a configured historical window of time to identify non-VM related space usage trends as well. As such, VMs may be recommended to be moved between storage devices to load balance (e.g., free up storage resources at the source storage devices) even when the VMs themselves may not be the source of space growth. The one or more statistical models use at least a subset of the input effective historical VM data related to space usage to output various predictions of predicted VM space usage for the VM(s) at the storage device (e.g., how much aggregated storage space one or more VMs that currently reside at the storage device is predicted to consume) at any point in time in a configured window of time in the future (e.g., the next seven days). The outputs from the statistical models may be sorted and the sorted distribution of predicted VM space usage at the storage device may be used to generate the predicted metric at the storage device corresponding to one or more space usage related metric types. For example, example space usage related metric types are the probability that 100% of the space at the storage device is predicted to be consumed at any time within the next seven days, the probability that 98% of the space at the storage device is predicted to be consumed at any time within the next seven days, and the probability that 95% of the space at the storage device is predicted to be consumed at any time within the next seven days. In some embodiments, the predicted metric (the probability) corresponding to a space usage related metric type (e.g., the probability that 100% of the space at the storage device is predicted to be consumed at any time within the next seven days) may be a range of probabilities/percentages that is determined by adding and/or subtracting an interval from a single value that is determined from sorted distribution of predicted VM space usage at the storage device.

In some embodiments, space usage modeling engine 306 is configured to generate updated space usage related metric types by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, space usage modeling engine 306 is configured to generate space usage related metric types by using the aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Access distribution modeling engine 308 is configured to generate predicted metrics related to access rate related metric types. In some embodiments, a storage device includes at least a higher tier of storage comprising flash and at least a lower tier of storage comprising disk. In some embodiments, the flash storage is configured to store frequently accessed and/or otherwise higher priority data and the disk storage is configured to store less frequently accessed and/or otherwise lower priority data. In some embodiments, due to the higher cost of flash (or another higher tier of storage associated with faster accesses), the amount of flash in a storage device is limited and typically entirely consumed (e.g., up to the configured allotted/maximum percentage of flash space) for storing VM data. The remaining VM data that is not serviced by flash and/or is evicted from flash at a storage device is stored at disk at the storage device. In some embodiments, the amount of the disk (or another lower tier of storage associated with faster accesses) is less limited than flash and is able to store data that does not meet the criteria for being stored in flash. In some embodiments, access distribution modeling engine 308 is configured to use the aggregated effective historical VM data related to accesses made at flash and disk at each storage device (e.g., how many times each flash block was accessed and how many times disk was accessed) (e.g., that is stored either at the storage device and/or at aggregated effective historical VM data storage 304) from a configured historical window of time (e.g., the past seven days) to model a distribution of flash and disk at the storage device. Access distribution modeling engine 308 is configured to determine a measured "flash hit rate" at the storage device based on the aggregated effective historical VM data (e.g., of the past seven days). In various embodiments, the "flash hit rate" refers to the percentage of accesses at the storage device that were serviced by flash (i.e., the percentage that requested data was found in flash). In various embodiments, the "flash miss rate" refers to the percentage of accesses at the storage device that was serviced by disk (i.e., the percentage that requested data was found in disk). The relationship between the flash hit rate and the flash miss rate is such that their sum is always 1. Example access rate metric types are the maximum between the flash miss rate and 3%, the maximum between the flash miss rate and 1%, and the maximum between the flash miss rate and 0.1%.

In some embodiments, access distribution modeling engine 308 is configured to use the measured flash hit rate and the measured access distribution across flash and disk to determine a prediction parameter (which is sometimes referred to as the "d" parameter) that comprises a probability of access of the most frequently accessed block in disk at the storage device. Then, in modeling the updated access rate related predicted metrics in response to a hypothetical (what-if) addition of a VM to the storage device or the hypothetical removal of a VM from the storage device, in some embodiments, access distribution modeling engine 308 is configured to use the "d" parameter that was previously computed for the storage device to determine the updated flash hit rate (or flash miss rate). In some embodiments, access distribution modeling engine 308 is configured to generate an updated access rate related metric type by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, access distribution modeling engine 308 is configured to generate updated access rate related metric types by using aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Metric prediction generation engine 310 is configured to generate a storage device specific predicted metric data structure corresponding to each storage device. In some embodiments, the storage device specific predicted metric data structure comprises a vector (e.g., a one-dimensional array). In various embodiments, metric prediction generation engine 310 is configured to include/insert the predicted metrics that were generated (e.g., by space usage modeling engine 306 and/or access distribution modeling engine 308) for the storage device in a corresponding storage device specific predicted metric data structure. In various embodiments, metric prediction generation engine 310 is configured to include the predicted metrics in the corresponding storage device specific predicted metric data structure in a manner such that each predicted metric is included in the data structure at a position associated with a priority corresponding to the metric type of that predicted metric. For example, the predicted metric associated with the metric type that is associated with the highest priority is included in the element that is associated with the lowest index/first position of the vector, the predicted metric associated with the metric type that is associated with the second highest priority is included in the element that is associated with the second lowest index/second position of the vector, and so forth. In some embodiments, metric prediction generation engine 310 is configured to store the storage device specific predicted metric data structures at predicted metric data structures storage 312.

Metric prediction generation engine 310 is further configured to combine the storage device specific predicted metric data structure corresponding to each storage device that is associated with a pool of storage devices into a combined, pool-level predicted metric data structure. In some embodiments, the combined, pool-level predicted metric data structure comprises a vector (e.g., a one-dimensional array). In various embodiments, to determine the combined, pool-level predicted metric data structure, metric prediction generation engine 310 is configured to determine the joint probability among the predicted metrics of the same metric type corresponding to the storage device specific predicted metric data structures corresponding to all storage devices of the pool. Metric prediction generation engine 310 is configured to include/insert each joint probability corresponding to each metric type into the combined, pool-level predicted metric data structure at a position associated with a priority corresponding to the metric type. For example, the combined predicted metric (e.g., the joint probability) of the storage device specific predicted metrics associated with the metric type of the highest priority may be included in the element that is associated with the lowest index/first position of the vector, the combined predicted metric of the storage device specific predicted metrics associated with the metric type of the second highest priority may be included in the element that is associated with the second lowest index/second position of the vector, and so forth. In some embodiments, metric prediction generation engine 310 is configured to store the combined, pool-level predicted metric data structure corresponding to each pool at predicted metric data structures storage 312.

VM selection engine 314 is configured to select sets of VMs to move from their source storage device(s) to destination storage device(s) within the same pool of storage devices. In various embodiments, VM selection engine 314 is configured to compare each combined predicted metric of a combined predicted metric data structure associated with a pool to a predetermined threshold value associated with the corresponding metric type. In the event that the combined predicted metric exceeds the predetermined threshold value, then the combined predicted metric (and its associated metric type) is identified as one that is to be improved. For example, each predetermined threshold value comprises a high probability of the occurrence of the metric type (e.g., an undesirable scenario or event). In some embodiments, VM selection engine 314 is configured to determine candidate sets of VMs to move off their current source storage device(s) such that by doing so, the updated combined predicted metric of one or more metric types associated with combined predicted metrics may be improved (e.g., their probabilities may be lowered below the predetermined threshold values). In some embodiments, VM selection engine 314 is configured to determine which destination storage device to move a candidate set of VMs such that by doing so, the updated combined predicted metrics improve over their current values, with preference given to improving those combined predicted metrics associated with metric types associated with higher priorities. In some embodiments, VM selection engine 314 is configured to use user configured rules and/or other rules in VM restriction rules storage 320 (e.g., rules that determine which VMs can or cannot be moved to and from) to constrain the search for which sets of VMs to move and how. In some embodiments, VM selection engine 314 is configured to use storage device attributes (e.g., maximum capacity, flash capacity, compression/dedupe capabilities, and maximum normalized IOPS) stored at storage device attributes storage 324 to constrain the search for which sets of VMs to move and how. In some embodiments, VM selection engine 314 is further configured to use the relative performance of each storage device to other storage devices within the same pool to constrain the search for which sets of VMs to move and how. In some embodiments, a metric of "performance reserves" is computed by each storage device as a measure of its available performance capacity. In some embodiments, the performance reserves of a storage device are shown on a scale of 0 to 100%. Some storage devices have greater performance, so when moving a VM, the performance reserves need to be re-evaluated in terms of their impact on the new storage device. Re-evaluating performance reserves is performed by constructing the effective data from the source of the performance reserves computation (e.g., IOPS and throughput measurements) rather than previously determined performance reserves themselves. In another example, the performance reserves may also be scaled up and down based on the relative capacities of the storage device models. This is just a scaling factor associated with each model, and so would be similar to other storage device attributes like maximum capacity. In some embodiments, VM selection engine 314 is configured to cause space usage modeling engine 306 and access distribution modeling engine 308 to respectively generate updated storage device specific predicted metrics for different hypothetical/candidate migrations of sets of VMs between storage devices of the same pool. In some embodiments, VM selection engine 314 is configured to cause metric prediction generation engine 310 to generate updated combined predicted metrics for different hypothetical/candidate migrations of sets of VMs between storage devices of the same pool. In some embodiments, VM selection engine 314 is configured to send a selection of a set of VMs to move from their source storage device(s) to a destination storage device to recommendation engine 316.

Recommendation engine 316 is configured to generate a set of recommendations that includes selections of one or more sets of VMs to be moved from their current storage device(s) to respective new destination storage device(s) within the same pool. In some embodiments, each recommendation identifies the VMs to move, the source storage device(s) of the VMs, the destination storage device(s) of the VMs, and the expected benefit of the migration (e.g., the combined predicted metric of which metric type is predicted to be improved as a result of the migration). Recommendation engine 316 is configured to store the set of recommendations in recommendation history storage 318. In various embodiments, recommendation engine 316 is configured to cause a set of recommendations to be presented at user interface 322. A user may approve of one or more recommendations to be implemented via a selection at user interface 322. A user may also reject one or more recommendations to be implemented via a selection at user interface 322. Recommendation engine 316 is configured to initiate the implementation of the VM migration(s) associated with each of one or more user approved recommendations by, for example, sending data to a hypervisor associated with the VM(s) to migrate and/or a storage device from which the VM(s) are to be moved from/to.

Recommendation engine 316 is configured to periodically determine whether a recommendation that is presented at user interface 322 is still valid. In some embodiments, recommendation engine 316 may determine whether any circumstances changed since a recommendation was generated such that it would no longer be available to be implemented. For example, a deletion of a VM that is included in a recommendation may cause that recommendation to become invalidated. Invalidated recommendations may be removed from being presented at user interface 322 and in some embodiments, the invalidation of a recommendation may trigger the presentation of a previously generated but not presented recommendation and/or the presentation of a new, alternative recommendation.

Recommendation history 318 is configured to store a history of previously generated recommendations. Recommendation history 318 may also store data indicating which historical recommendations were approved by a user to be implemented, which recommendations were not approved, and which recommendations were invalidated (and for which reason). In some embodiments, recommendation engine 316 is configured to periodically determine whether the combined predicted metrics associated with historical recommendations (whether they were approved to be implemented or not) matched the subsequent actual combined metrics of each pool of storage devices. The determined accuracy of the historical recommendations may be used to improve subsequent metric predictions.

Figure 4:
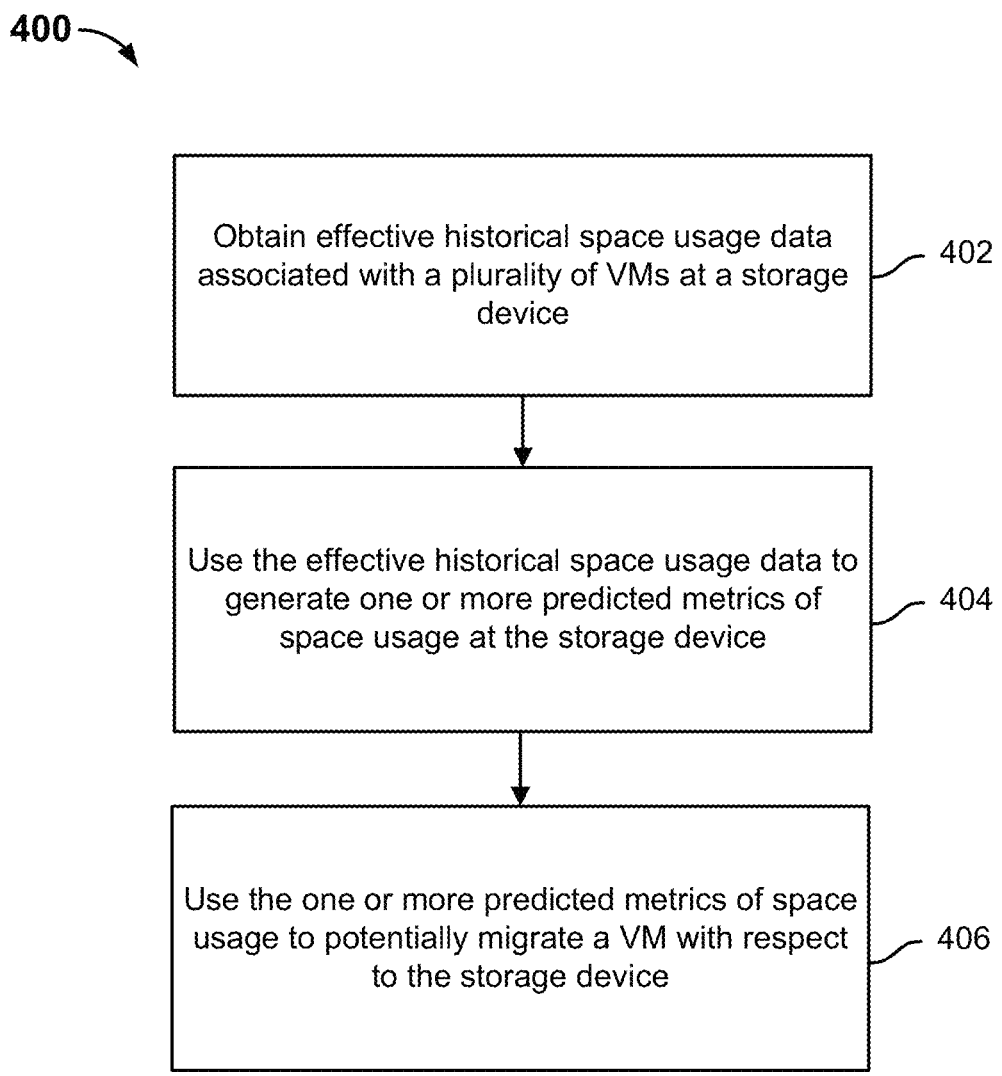
FIG. 4 is a flow diagram showing an embodiment of a process for predicting storage space usage at a storage device.

FIG. 4 is a flow diagram showing an embodiment of a process for predicting storage space usage at a storage device. In some embodiments, process 400 is implemented by VM load balancing server 112 of system 100 of FIG. 1.

At 402, aggregated effective historical space usage data associated with a plurality of VMs at a storage device is obtained. In some embodiments, the space usage data associated with a predetermined historical window of time is considered. For example, the predetermined historical window of time is the last 30 days. In some embodiments, space usage data is maintained for each VM at each predetermined interval within the predetermined historical window of time. For example, the predetermined interval of time is one day. So, for example, the historical space usage data associated with each VM from each day from the last 30 days may be obtained from the storage device at which it resided at each one of such days.

To determine the aggregated effective historical space usage data associated with the VMs that currently reside at a current storage device, the recorded historical space usage data (e.g., from the last 30 days) associated with the VM(s) that have been added (e.g., migrated/moved from) from other source storage device(s) to the current storage device is obtained from these other source storage device(s). In some embodiments, the recorded historical space usage data (e.g., from the last 30 days) associated with the VM(s) that have been added is first augmented (e.g., based on comparisons between the deduplication capabilities between the current storage device and a VM's source storage device) before being added to the aggregated historical space usage data associated with the VMs that currently reside at the current storage device.

Furthermore, to the determine the aggregated effective historical space usage data associated with the VMs that currently reside at a current storage device, the recorded historical space usage data (e.g., from the last 30 days) associated with the VM(s) that have been removed (e.g., migrated/moved) from the current storage device is discarded (or ignored for making predictions associated with space usage at the current storage device).

In some embodiments, the obtained historical space usage data associated with recently added VMs is combined with the historical space usage data of the VMs that remain at (i.e., the VM(s) that were not migrated from) the current storage device to determine the aggregated effective historical space usage data across all VMs that are currently residing at the current storage device. In some embodiments, the aggregated effective historical space usage data across all VMs that are currently residing at the current storage device comprises a value associated with the aggregated effective historical space usage at each predetermined interval (e.g., day) across the predetermined historical window of time (e.g., the past 30 days).

At 404, the aggregated effective historical space usage data is used to generate one or more predicted metrics of space usage at the storage device. In some embodiments, samples of the aggregated effective historical space usage data across all VMs that are currently residing at the current storage device are input into one or more statistical models that each output predicted space usage metrics over a predetermined period of time in the future (e.g., the next seven days). The one or more statistical models output a set of predicted space usage metrics over the predetermined period of time in the future.

At 406, the one or more predicted metrics of space usage are used to potentially migrate a VM with respect to the storage device. In some embodiments, the predicted space usage metrics over a predetermined period of time in the future are used to determine whether any VM(s) that currently reside at the current storage device should be moved/migrated to another storage device (e.g., that belongs to the same pool as the current storage device). For example, if the predicted space usage metrics predict that there is a probability greater than a predetermined threshold that an undesirable event (e.g., 100% of space usage at the storage device will be exceeded), then in a load balancing process, one or more VMs could potentially be determined to be removed from the storage device to lower the probability that the undesirable event will occur.

Figure 5:
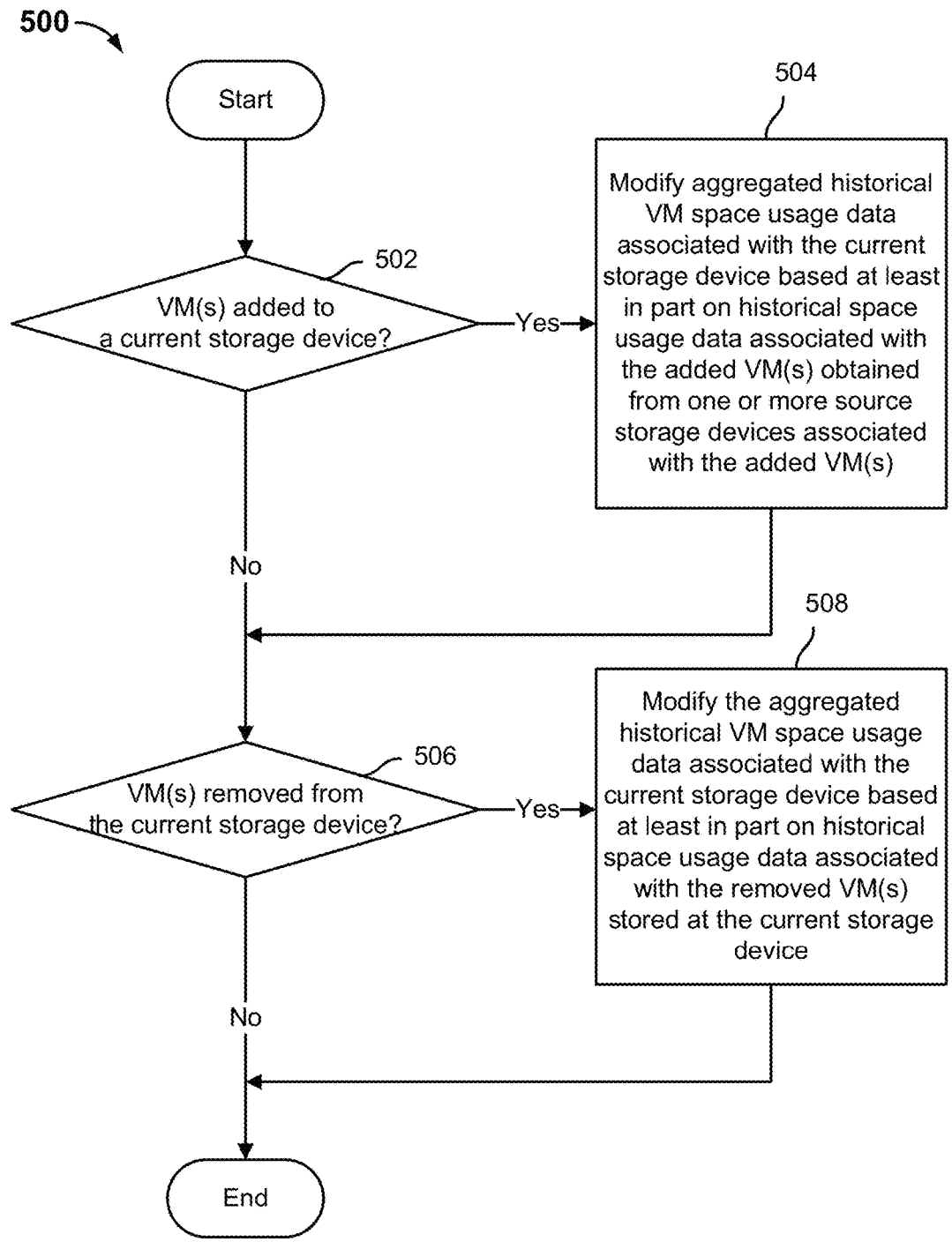
FIG. 5 is a flow diagram showing an embodiment of a process for determining the effective historical VM space usage data at a storage device.

FIG. 5 is a flow diagram showing an embodiment of a process for determining the effective historical VM space usage data at a storage device. In some embodiments, process 500 is implemented by VM load balancing server 112 of system 100 of FIG. 1. In some embodiments, step 402 of process 400 of FIG. 4 is implemented, at least in part, using process 500.

In some embodiments, process 500 is performed subsequent to the completion of migrating one or more VMs within a pool of storage devices in response to a user approval of a recommendation and/or prior to generating predicted metrics in a load balancing process across the pool at a particular storage device of the pool. For example, a recommendation was presented to a user to move VM(s) from a first storage device to a second storage device within a pool, and the user approved the recommendation. As a result of the user approving the recommendation, the VM(s) included in the recommendation were moved to their respective destination storage device(s) that were identified in the recommendation. After the VMs were moved, the resource (e.g., storage space) usage on the source storage device goes down, and usage on the destination storage device goes up. But, if these changes are not taken into account in making subsequent predicted metrics at either or both the source and destination storage devices, then the original problem (e.g., a lack of storage space) may still appear to exist on the source storage device, and the destination storage device may appear to have more available storage space than it actually does. As such, a process such as process 500 is used, in various embodiments, so that metric predictions may be computed on the "effective" history of a storage device, with the effects of completed VM storage migration(s) taken into account. As will be described in further detail with process 500, the effective historical VM data at a storage device is determined by:

Subtracting out the space usage contributions of the moved VM from every historical data point (e.g., within a configured window of time in the past) prior to its move from the source storage device.

Adding in the space usage contributions of the moved VM to every data historical data point (e.g., within a configured window of time in the past) prior to its move on the destination storage device.

Then, for example, the trend and variability of the space usage on the destination storage device of the moved VM may be incorporated into future predictions.

At 502, it is determined that VM(s) have been added to a current storage device. In the event that VM(s) have been added to the storage device, control is transferred to 504. Otherwise, in the event that no VM(s) have been added to the storage device, control is transferred to 506. At 502, the storage device for which process 500 is performed is a destination storage device for the newly added VM(s). VM(s) may have been added by a VM migration (e.g., that resulted from a user approval of a VM load balancing recommendation).

At 504, aggregated historical VM space usage data associated with the current storage device is modified based at least in part on historical space usage data associated with the added VM(s) obtained from one or more source storage devices associated with the added VM(s). Historical space usage data associated with each added VM is obtained from the source storage device from which that VM was moved from and then added to the aggregated historical VM space usage data that is stored at the current storage device. In some embodiments, space usage data obtained for added VM(s) may be transformed/scaled (e.g., based on an attribute of the storage device such as its deduplication capabilities relative to that of the source storage device) prior to being added at the destination storage device.

At 506, it is determined that VM(s) have been removed from the current storage device. In the event that VM(s) have been removed from the current storage device, control is transferred to 508. Otherwise, in the event that no VM(s) have been removed from the storage device, process 500 ends. At 506, the storage device for which process 500 is performed is a source storage device for the removed VM(s). VM(s) may have been removed by a VM migration (e.g., that resulted from a user approval of a VM load balancing recommendation).

At 508, the aggregated historical VM space usage data associated with the current storage device is modified based at least in part on historical space usage data associated with the removed VM(s) stored at the current storage device. Historical space usage data associated with each removed VM that was stored at the storage device is excluded from the determination of the aggregated effective historical VM space usage data associated with the storage device. In some embodiments, the historical data of the removed VMs is discarded (e.g., deleted). In some embodiments, the historical space usage data of the removed VMs is retained but indicated to not be included in the aggregated effective historical VM space usage data.

Figure 6:
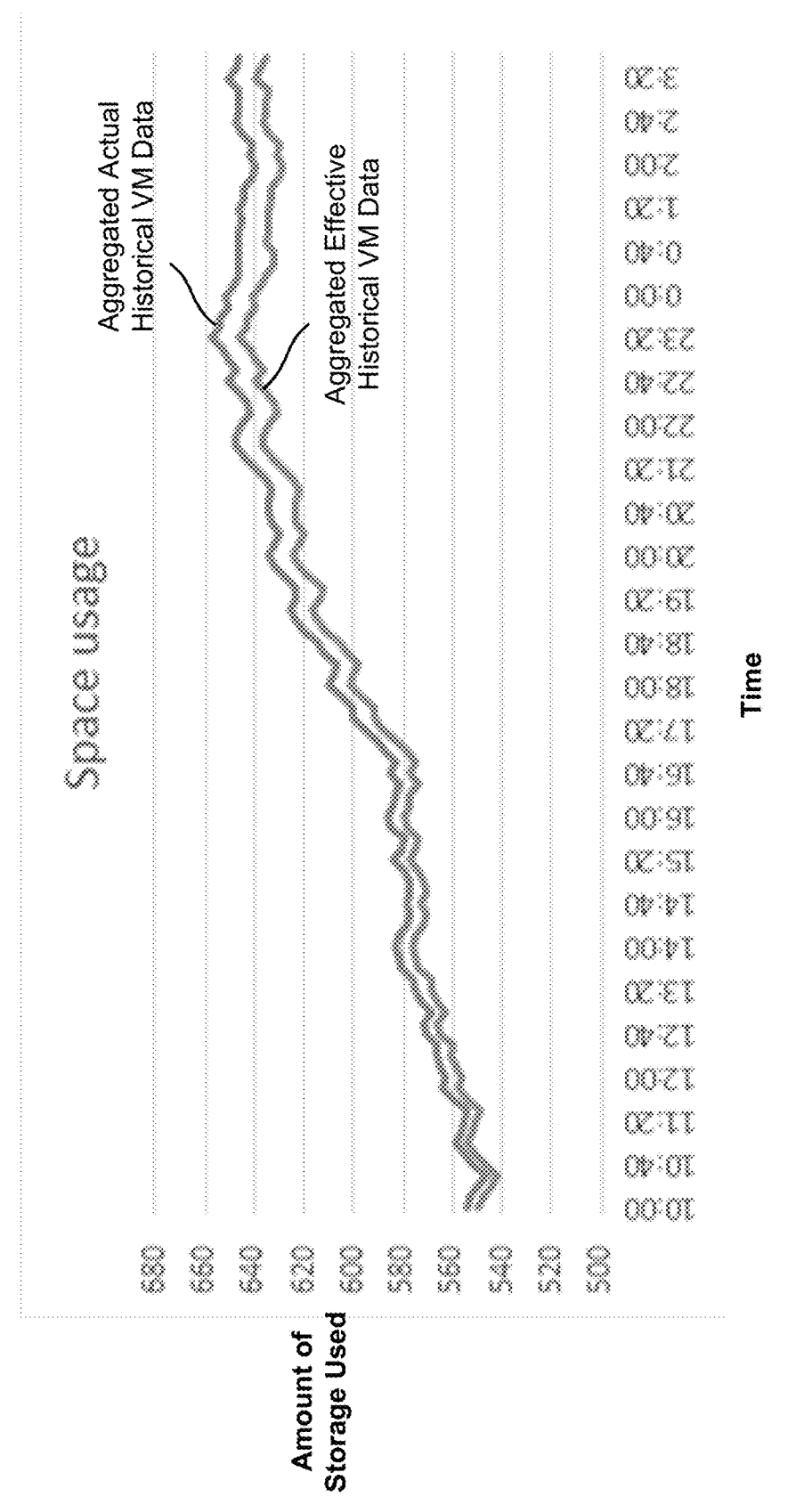
FIG. 6 is a diagram showing an example of comparing an aggregated actual historical VM data plot with an aggregated effective historical VM data plot at Storage Device A.

FIG. 6 is a diagram showing an example of comparing an aggregated actual historical VM data plot with an aggregated effective historical VM data plot at Storage Device A. The top plot shows the aggregated actual historical VM space usage data that is stored at Storage Device A across different points in time before accounting for the migration of one or more VMs that were moved/migrated off of Storage Device A. The bottom plot shows the aggregated effective historical VM space usage data that is stored at Storage Device A after accounting for the migration of one or more VMs off of Storage Device A. As such, the aggregated effective historical VM space usage data shows less space usage data at each time point (e.g., each predetermined interval) because the space usage contributions of one or more VMs have been removed from each time point.

Some of these historical VM data must be approximated since the complete component-wise statistical breakdown may not be stored in some embodiments. In some embodiments, only the deltas against the source and destination storage devices are stored as it is more efficient than copying the data and applying the delta. Deltas may be easily removed or adjusted in the case that they are the cause of problems. Deltas are also easier to check against the actual historical VM data.

In some embodiments, when a new performance data point (e.g., of space usage) is generated (e.g., at a predetermined interval), the "effective history" table does not need to be altered.

Figure 7:
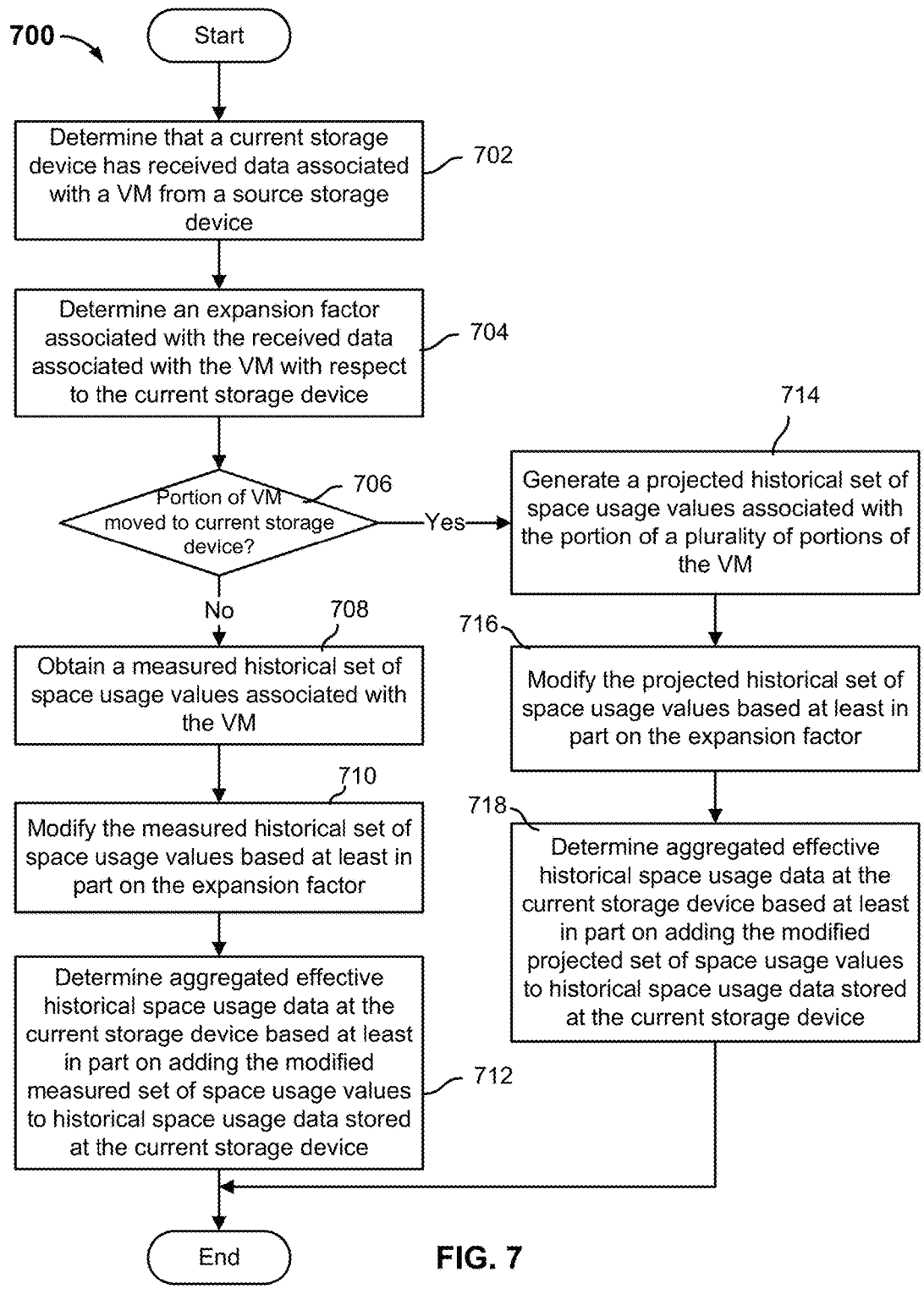
FIG. 7 is a flow diagram showing an example of a process for determining the effective historical VM space usage data for a current storage device with a newly added VM.

FIG. 7 is a flow diagram showing an example of a process for determining the effective historical VM space usage data for a current storage device with a newly added VM. In some embodiments, process 700 is implemented by VM load balancing server 112 of system 100 of FIG. 1. In some embodiments, step 504 of process 500 of FIG. 5 is implemented, at least in part, using process 700.

At 702, it is determined that a current storage device has received data associated with a VM from a source storage device. Data associated with a VM has been moved and added to the current storage device from another storage device. The other storage device from which VM data was migrated is referred to as the "source storage device." In some embodiments, the VM data is migrated to the current storage device from the VM's source storage device as a result of a load balancing technique to improve the overall predicted metrics of a pool of storage devices to which the current storage device and the source storage device both belong. In process 700, the "current storage device" refers to the target/destination storage device for which the effective historical VM space usage data is being determined. In some embodiments, the data associated with the newly added VM is obtained from the source storage device. In some embodiments, in the event that the VM is a multi-component VM and therefore has data simultaneously stored at more than one storage device, data associated with different components of the VM may be received at the current storage device from more than one source storage device.

At 704, an expansion factor associated with the received data associated with the VM is determined with respect to the current storage device. In various embodiments, the data associated with the newly added VM is modified by an expansion factor prior to being combined with the other effective historical VM space usage data at the current storage device. The expansion factor may comprise a value or a function, for example. In various embodiments, the "expansion factor" takes into account the difference in deduplication capabilities that are provided by the source storage device and the current storage device. For example, for a current storage device that provides better deduplication capabilities (i.e., is able to store the same data using less storage space than the source storage device), the expansion factor may be less than 1. For example, for a current storage device that provides worse deduplication capabilities (i.e., needs to use more storage space than the source storage device to store the same data), the expansion factor may be greater than 1. Example factors that may influence the determination of the expansion factor include whether the newly added VM had any snapshots stored at the source storage device, whether the newly added VM was a clone VM or was a parent to one or more clones at the source storage device, and a difference between the compression and deduplication capabilities between the source storage device and the current storage device. An example process for determining an expansion factor for a current storage device is described in further detail below in FIG. 8.

At 706, it is determined whether the received data associated with the VM comprises a portion of the VM that has moved to the current storage device. In the event that the received data associated with the VM comprises a portion of the VM that has moved to the current storage device, control is transferred to 714. Otherwise, in the event that the received data associated with the VM is the entirety of the VM that has been moved to the current storage device, control is transferred to 708. It is determined whether the newly added VM is actually a multi-component VM (i.e., a VM for which data is simultaneously stored at more than one storage device) and whether only a portion (e.g., fewer than all the components) of the VM had been received at the current storage device. For example, a VM may have live data, which refers to data that is tracked in an inventory of a hypervisor, stored at Source Storage Device A, and snapshot data that is stored at Source Storage Device B. In one example, only the live data portion of the VM may be migrated from Source Storage Device A to the current storage device while the snapshot data of the VM may remain at Source Storage Device B. In another example, all components (the entirety) of the VM, including the live data portion of the VM stored at Source Storage Device A and the snapshot data of the VM that was stored at Source Storage Device B may be migrated to the current storage device.

In some embodiments, it is determined that less than the entirety of the VM has been moved to the current storage device by the following: the VM load balancing server accesses each storage device (e.g., in a pool) at which any portion of a VM is currently residing. Each accessed storage device indicates whether the VM is "live" on that storage device, or comprises only "non-live" data like snapshots or replicas. When a VM is moved, the source and destination storage devices are specifically identified, and only the portion of the migrated VM on the source storage device is moved. For example, only the live portion of a VM is moved from its source storage device, only a replica portion of a VM is moved from its source storage device, or only an old snapshot of a VM is moved from its source storage device. In some embodiments, the recommendation source and destination storage devices are checked to determine which appropriate component of a VM is to be added or subtracted.

At 708, a measured historical set of space usage values associated with the VM is obtained. In various embodiments, the measured historical set of space usage values associated with the VM is obtained from the one or more source storage devices at which the received data associated with the newly added VM was previously stored. In some embodiments, the measured historical set of space usage values associated with the VM comprises a measured aggregate space usage by the entire (e.g., across all components of the) VM at each predetermined interval (e.g., day) across a predetermined historical window of time (e.g., the past 30 days).

At 710, the measured historical set of space usage values is modified based at least in part on the expansion factor. Each of the values of the measured historical set of space usage values is modified by the expansion factor. For example, a measured historical space usage is modified by the expansion factor by virtue of being multiplied by the expansion factor.

At 712, aggregated effective historical space usage data at the current storage device is determined based at least in part on adding the modified measured set of space usage values to historical space usage data stored at the current storage device. The modified measured set of space usage values of each newly added VM is combined with (e.g., added to) the modified measured set of space usage values of every other VM that was newly added to the current storage device as well as the historical space usage values of VMs that were measured at the current storage device. For example, if VM 1 and VM 2 were already residing at the current storage device and VM 3 was recently added to the current storage device, then the modified measured set of space usage values of VM 3 would be added to the historical space usage values of VM 1 and VM 2 that had been measured by the current storage device to determine the aggregated effective historical space usage data at the current storage device.

At 714, a projected historical set of space usage values associated with the portion of a plurality of portions of the VM is generated. In some embodiments, only the aggregate (i.e., across all components) measured historical set of space usage value for a VM at each predetermined interval (e.g., day) across a predetermined historical window of time (e.g., the past 30 days) is stored, whereas the measured historical set of space usage value for each particular component of the VM at each predetermined interval is not stored (e.g., to reduce the amount of space usage data that needs to be stored). In some embodiments, the most recently measured space usage value, however, for each component of the multi-component VM is stored. As such, to determine the measured historical set of space usage values of one component (or other subset) of the multi-component VM, the most recently measured space usage value for each component of the multi-component VM and the aggregate (i.e., across all components) measured historical set of space usage values are used to project the historical set of space usage values for that one component (or other subset) at each predetermined interval (e.g., day) across a predetermined historical window of time (e.g., the past 30 days). Examples of projecting the historical set of space usage values for a subset of components of a VM are described with FIGS. 9 and 10, below.

At 716, the projected historical set of space usage values is modified based at least in part on the expansion factor. Each of the values of the projected historical set of space usage values of the component(s) of the VM is modified by the expansion factor. For example, a measured historical space usage is modified by the expansion factor by virtue of being multiplied by the expansion factor.

At 718, aggregated effective historical space usage data at the current storage device is determined based at least in part on adding the modified projected set of space usage values to historical space usage data stored at the current storage device. The modified projected set of space usage values of each newly added VM is combined with (e.g., added to) the modified measured or projected set of space usage values of every other VM that was newly added to the current storage device as well as the historical space usage values of VMs that were measured at the current storage device. For example, if VM 1 and VM 2 were already residing at the current storage device and the live data of VM 3 was recently added to the current storage device, then the modified projected set of space usage values of VM 3 would be added to the historical space usage values of VM 1 and VM 2 that had been measured by the current storage device to determine the aggregated effective historical space usage data at the current storage device.

Figure 8:
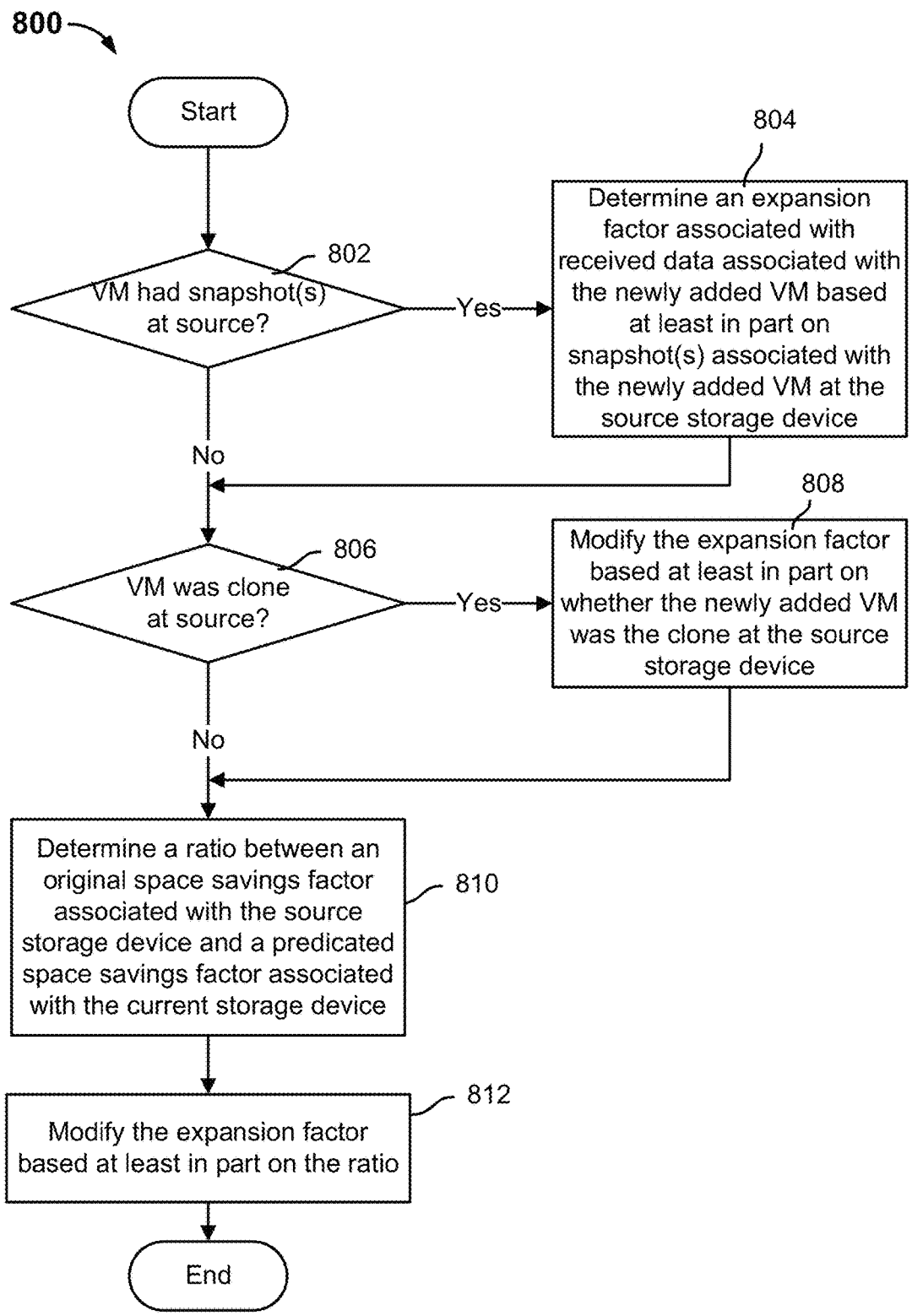
FIG. 8 is a flow diagram showing an example of a process for determining an expansion factor associated with a newly added VM with respect to a current storage device.

FIG. 8 is a flow diagram showing an example of a process for determining an expansion factor associated with a newly added VM with respect to a current storage device. In some embodiments, process 800 is implemented by VM load balancing server 112 of system 100 of FIG. 1. In some embodiments, step 704 of process 700 of FIG. 7 is implemented, at least in part, using process 800.

Process 800 describes an example process of determining the expansion factor for data received at a current storage device associated with a newly added VM.

At 802, it is determined whether a newly added VM had snapshot(s) at a source storage device. In the event that the newly added VM had one or more snapshots from the source storage device from which the newly added VM was migrated, control is transferred to 804. Otherwise, in the event that the newly added VM did not have one or more snapshots from the source storage device from which the newly added VM was migrated, control is transferred to 806.

In some embodiments, successive snapshots associated with a VM are stored as delta representations. Put another way, each subsequently created snapshot includes only data or references to data that is new or modified since the immediately previously created snapshot. As such, adjacent/successive snapshots typically share a lot of common blocks of data. The live portion of a VM may share common blocks with snapshots by referring (e.g., pointing) to portions of one or more snapshots that store the blocks that were more recently written to the VM.

Without deduplication, the live VM and the most recent snapshot will have a lot of blocks in common that migration of the live VM will "un-share." As such, if the live data of a VM is moved but not the VM's snapshots, then the live data would occupy as many blocks of data on the destination storage device as it had on the source storage device. Moving the snapshots to the deduplication incapable destination storage device as well causes a space increase, because blocks that were shared are now duplicated.

For example, if a VM is migrated to a storage device that does not dedupe for capacity (i.e., storage devices with deduplication incapable storage types), this additional cost must be taken into account.

In some embodiments, the space used on the destination (current) storage device could be estimated as, for example:

$$\text{live physical space usage} \cdot 2 + \text{snapshot-only physical space usage}$$

The pessimistic assumption is that every block in the live VM will also be in the current snapshot. (The best case is that every block in the VM has been overwritten.) If every block that is currently live also appears in a snapshot, then the destination will have two copies of each of those blocks, one from the live copy and one from the migrated snapshot. This is the worst possible, because a logical block cannot have more than two copies. The combined size of the deltas==the total size of the file, and there is one copy of every block in the deltas, and one copy of every block in the live version. Blocks that do not appear in the live file (i.e., are snapshot-only) do not occupy excess space on the destination.

For example, there are 5 blocks in the VM. Blocks 0-4 appear in the live file and are copied to new blocks L0-L4. Blocks 0-4 also appear in the snapshot and are copied to new blocks S0-S4. While there was originally just 5 blocks, now there are 10 blocks, a 2× increase.

If every block that is currently live does not appear in any snapshot, then the destination will have just one copy of each of those blocks. This corresponds to complete overwriting of the VM since the last snapshot. So the snapshot(s) will reference one set of blocks, which will be migrated over, and the live file will reference a completely distinct set of blocks, which will be migrated over. In this case, blocks 0-4 appear in the live file, and blocks 5-9 appear in the snapshots. Blocks 0-4 are copied to create blocks L0-L4 and the snapshot is copied to create blocks S5-S9. But these are just the same 10 blocks that were started out with, a 1× increase.

This addition of "live physical space" should be applied at every point in the adjusted history (otherwise the prediction determination technique may ignore it as an outlier.)

On a deduplication-capable target, no adjustment is needed, in some embodiments.

At 804, an expansion factor associated with received data associated with the newly added VM is determined based at least in part on snapshot(s) associated with the newly added VM at the source storage device.

In the event that the migrated data associated with the newly added VM is going to take up more storage space at the current storage device due to the existence of snapshots at the source storage device, the expansion factor associated with the data will be modified to be a value greater than one (e.g., based on the expected degree of expansion at the current storage device, as described above).

At 806, it is determined whether the newly added VM was a clone at the source storage device. In the event that the newly added VM was a clone at the source storage device from which the newly added VM was migrated, control is transferred to 808. Otherwise, in the event that the newly added VM was not a clone at the source storage device from which the newly added VM was migrated, control is transferred to 810.

In various embodiments, a "clone" refers to a copy of an existing set of data (the existing set of data is sometimes referred to as "source" data or "parent" data). In various embodiments, a clone is generated from a snapshot of the parent data. In various embodiments, the snapshot of the source data from which a clone is created is referred to as a "shared snapshot." To generate the clone, a new set of metadata is created and data associating the clone's new set of metadata to the parent data's set of metadata is stored such that at least some of the snapshot indices associated with the parent data are to be shared with the new set of metadata associated with the clone and at least some of the data associated with parent data is shared with the clone.

If a clone is moved (without deduplication support at the destination storage device), then its effective size will increase, since any shared data from the parent VM will also be copied and migrated to the destination storage device.

(On a deduplication capable storage device, moving multiple VMs from the same parent would offset this increase, if it is remembered which VMs used to be clones but are not any longer.)

The expansion of the storage space of a migrated clone is increased by at least two factors: any snapshots of the clone and live data of the clone, both of which implicitly refer to the parent.

The pessimistic estimate is that every physical byte in the parent gets copied and migrated to a deduplication incapable destination storage device.

For the VM being moved, the live data is:
A. Live reported for the VM, plus
B. Live reported for the parent (blocks referred to by the thin clone)

The snapshot data of the VM being moved is:
C. Snapshot reported for the VM, plus
D. Live data shared between live and snapshot (another copy of A)
E. Live reported for the parent (another copy of B)

As such, the following example formula expresses the pessimistic estimate for the storage space to be occupied by a migrated clone VM at the deduplication incapable destination storage device:

Post-migration space usage=clone live physical space usage*2+parent live physical usage*2+ clone snapshot physical space usage Parent live physical space usage is used as a proxy for the physical space usage of the clone parent. It may differ significantly if the parent VM has been in active use—but usually it will only grow. In some embodiments, it does not make sense to use the parent's snapshot space usage, which may be too small (not enough overwrites) or too large (multiple snapshots with lots of changes, only one of which is actually relevant).

If an "effective physical size" for the snapshot which is the parent of the clone is known, that can be used directly instead of using the parent VM size as an estimate, in some embodiments.

In some embodiments, if the clone has no snapshots of its own, then the above formula can be simplified to:

Post-migration space usage=clone live physical space usage+parent live physical space usage It is also possible to determine whether there have been sufficient overwrites that a full copy of the parent is not incurred. The total physical size should not exceed the compressed and deduped version of the logical footprint of the file. (The term "logical footprint" is used rather than "provisioned" size, because the file may still be thin-provisioned.)

post-migration usage for live<=live written size*effective space savings factor on destination storage device The space savings factor will be described in further detail below.

If the newly added VM is a parent of a clone, then similar considerations apply. The source storage device will not see a significant decrease in space, unless many blocks have been overwritten by the clone. Also, a storage device does not typically allow a snapshot to be deleted unless it has only 1 (or 0) clones. Thus, if there is more than one clone, the expected space savings can be assumed to be zero at the source storage device because the parent VM will not be deleted at the source storage device. It is probably sufficient to assume that the space savings is zero in the 1-clone case too, but the bounding equation above can be used in extreme cases.

At 808, the expansion factor is modified based at least in part on whether the newly added VM was the clone at the source storage device.

In the event that the migrated data associated with the newly added VM is going to take up more storage space at the current storage device due to the newly added VM being a clone at the source storage device, the expansion factor associated with the data will be modified to be a value greater than one (e.g., based on the expected degree of expansion at the current storage device as described above).

At 810, a ratio between an original space savings factor at the source storage device and a predicted space savings factor at the current storage device is determined.

When a VM starts on a storage device with dedupe and compression, measurements about compressibility and deduplication capabilities on that storage device are generated, in some embodiments. Compressibility is specific to each VM and should carry over to other storage devices. Deduplication capability of a VM is probably more context-specific and it is not assumed that the VM will be more deduped at a new destination storage device than it was at the source storage device.

In the absence of better measurements, it seems safest to be pessimistic here as well so that a migration of a VM is safe.

In various embodiments, input stats are spaceSavingsFactor and compressionFactor. If spaceSavingsFactor includes "clone dedupe," that must be eliminated. A dedupeFactor can be computed from these two factors by dividing them (i.e., spaceSavingsFactor=compressionFactor*dedupeFactor).

compressionFactor=[uncompressed size of data]/ [compressed size of data(averaged over the entire VM)]

dedupeFactor=[undeduped size of data]/[deduped size of data]

For example, if 8 KB blocks may be compressed into 4 KB blocks, then the compressionFactor is 2. If 100 undeduped blocks could be stored as 60 dedupe blocks, then the dedupeFactor is 1.66667. The spaceSavingsFactor is 3.33, which could also be calculated as:

logical: 100 blocks @ 8 KB=800 KB
physical: 60 blocks @ 4 KB=240 KB
spaceSavings=800/240=3.33

Table 1 below includes example predicted space savings factors for migrations of a VM from various types of source storage devices to various types of destination storage devices:

TABLE 1

| Source Storage Device | Destination Storage Device | Predicted space savings factor |
|---|---|---|
| Compression and deduplication capable | Compression and deduplication capable | compressionFactor * minimum of dedupeFactors on source and destination |
| Compression and deduplication capable | Compression capable but not deduplication capable | =compressionFactor only |
| Compression and deduplication capable | Neither compression nor deduplication capable | =1.0 |
| Compression capable but not deduplication capable | Compression and deduplication capable | =compressionFactor only |
| Compression capable but not deduplication capable | Compression capable but not deduplication capable | =compressionFactor only |
| Compression capable but not deduplication capable | Neither compression nor deduplication capable | =1.0 |
| Neither compression nor deduplication capable | Compression and deduplication capable | =1.0 |
| Neither compression nor deduplication capable | Compression capable but not deduplication capable | =1.0 |
| Neither compression nor deduplication capable | Neither compression nor deduplication capable | =1.0 |

In some embodiments, the physical size predicted on the new storage device must be calculated based on the ratio of the original space savings factor at the source storage device, and the predicted space savings factor at the destination storage device.

More explanation on converting the projected space usage of a migrated VM at its destination storage device includes:

For a newly added VM, its spaceSavingsFactor, compressionFactor, and dedupeFactor in its source storage device are known.

Given the spaceSavingsFactor and compressionFactor and dedupeFactor in the newly added VM's source storage device, the VM spaceSavingsFactor that will be on the destination storage device depends on the type of storage devices that each of the current and destination is and can be predicted using Table 1 above.

The predicted increase of the physical space usage by the newly added VM at the destination storage device is by the ratio between original spaceSavingsFactor at the source storage device and new spaceSavingsFactor.

For example, if there is 2× compression 2× dedupe on the source storage device, and the destination is pre-compression, it is assumed that new spaceSavingsFactor=1× and the space usage of the newly added VM increases by 4×/1×=4× at the destination storage device.

In another example, if there is 2× compression 2× dedupe on the source storage device, and the destination storage device does not dedupe, it is assumed that the new spaceSavingsFactor=2× (compression only) and the space usage of the newly added VM increases by 4×/2×=2× at the destination storage device.

The destination storage device stats are used as an upper bound on dedupability likely to be achieved, to decrease the dedupe factor if it is "too high" on the source storage device.

In another example, if there is 2× compression 10× dedupe on the source storage device, but the destination storage device is only getting 2× dedupe, it is assumed that the space savings factor on destination storage device will be 4×, not 20×, so space usage increases by 20×/4×=5×.

At 812, the expansion factor is modified based at least in part on the ratio.

The expansion factor associated with the data will be modified to be a value greater than one based on the computed ratio.

Separately from process 800, in some embodiments, if the newly added VM was also being replicated to another storage device while being migrated to a destination storage device, in addition to increased space usage on the destination storage device of the migration, there may also be increased space usage on the destination storage device of the replication. The replication process may send a full copy instead of a delta relative to the last (pre-migration) snapshot. The replication protocol will be able to dedupe and save network throughput, but systems which do not dedupe for capacity may see some increased space usage.

Figure 9:
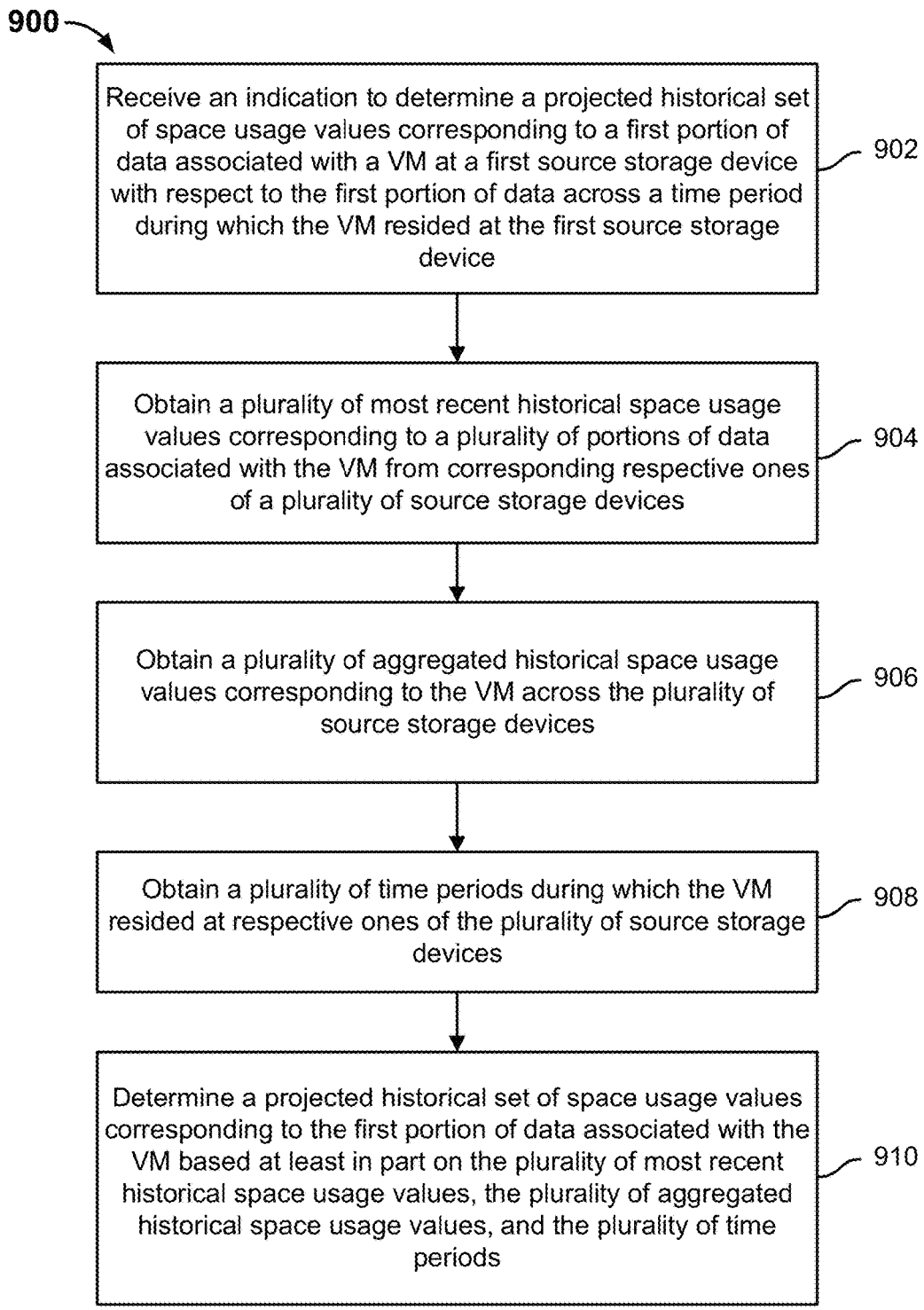
FIG. 9 is a flow diagram showing an example of a process for generating a projected historical set of space usage values associated with a migrated portion of a newly added VM to a current storage device.

FIG. 9 is a flow diagram showing an example of a process for generating a projected historical set of space usage values associated with a migrated portion of a newly added VM to a current storage device. In some embodiments, process 900 is implemented by VM load balancing server 112 of system 100 of FIG. 1. In some embodiments, step 714 of process 700 of FIG. 7 is implemented, at least in part, using process 900.

Process 900 describes a process of generating a projected historical set of space usage values at each predetermined interval (e.g., day) across a predetermined historical window of time (e.g., the past 30 days) for a portion (e.g., a component) out of multiple components of a VM that was migrated to a current storage device.

At 902, an indication to determine a projected historical set of space usage values corresponding to a first portion of data associated with a VM at a first source storage device with respect to the first portion of data across a time period during which the VM resided at the first source storage device is received.

For example, the indication may be received when the historical set of space usage values at each predetermined interval (e.g., day) across a predetermined historical window of time (e.g., the past 30 days) for a portion (e.g., a component) out of multiple components of a VM that was migrated to a current storage device is needed to determine the aggregated effective historical space usage data at the current storage device.

At 904, a plurality of most recent historical space usage values corresponding to a plurality of portions of data associated with the VM is obtained from corresponding respective ones of a plurality of source storage devices.

At 906, a plurality of aggregated historical space usage values corresponding to the VM across the plurality of source storage devices is obtained.

A VM may have several components (e.g., portions of data) stored at more than one storage device at a same time. For example, VM-123 may include a first portion of live data (which refers to data that is tracked in an inventory of a hypervisor) that is stored at Storage Device A and a second portion of live data that is stored at Storage Device B during at least some overlapping periods of time. In some embodiments, the storage device at which a component/portion of a VM resides, measures attribute values, including the current space usage, of that component of the VM at each predetermined interval (e.g., day) and sends the measured attribute values at each predetermined interval to a central server, such as a VM load balancing server (e.g., VM load balancing server 112 of FIG. 1). To save storage space from being overwhelmed by the frequently measured attribute values, the storage device does not store historical attribute values for each VM or portion thereof that reside at that storage device. Because the historical space usage of each component of a VM at each predetermined interval is not stored in some embodiments, such historical space usage data is projected based on the information that is available.

The central server aggregates the attribute values that are received from different storage devices for different components of the same VM to determine and store aggregated attribute values. As such, for example, the aggregated space usage of live data of VM-123 at each predetermined interval (e.g., by the central server) is the sum (or other combination) of the received space usage values of the first portion of live data from Storage Device A and the second portion of live data from Storage Device B for that interval (e.g., day). In some embodiments, in addition to the aggregated attribute (e.g., space usage) values, the space usage values that are most recently received from each storage device that stores a component/portion of a VM are stored.

At 908, a plurality of time periods during which the VM resided at respective ones of the plurality of source storage devices is obtained.

It is also known during which historical time periods each storage device stored which portion/component of a VM. For example, it is known that Storage Device A had stored the first portion of the live data of VM-123 from May $1^{st}$ to May $30^{th}$ and that Storage Device B had stored the second portion of the live data of VM-123 from May $1^{st}$ to May $30^{th}$ as well.

At 910, a projected historical set of space usage values corresponding to the first portion of data associated with the VM is determined based at least in part on the plurality of most recent historical space usage values, the plurality of aggregated historical space usage values, and the plurality of time periods.

Based on the available information of: the aggregated attribute space usage values associated with a VM, the space usage values that are most recently received from each storage device that stores a component/portion of the VM are stored, and the historical time periods during which each storage device stored which portion/component of the VM, in some embodiments, the current breakdown of space usage among the different storage devices will be used to estimate/project how much of the historical space usage was due to each component of the VM.

Returning to the example where a first portion of live data is stored at Storage Device A and a second portion of live data is stored at Storage Device B, assume that the historical space usage values that were most recently received from Storage Device A and B, respectively, were S1 and S2, then the simplest estimate/projection is that S1/(S1+S2) of the aggregated historical space usage values was transferred from Storage Device A to the current storage device.

For a more specific example, if VM-123 has 200 GB of live data on Storage Device A, and 400 GB of live data on Storage Device B, then it is projected that (200/(200+400)) =⅓rd of the aggregated space usage VM's history is attributable to Storage Device A.

Figure 10:
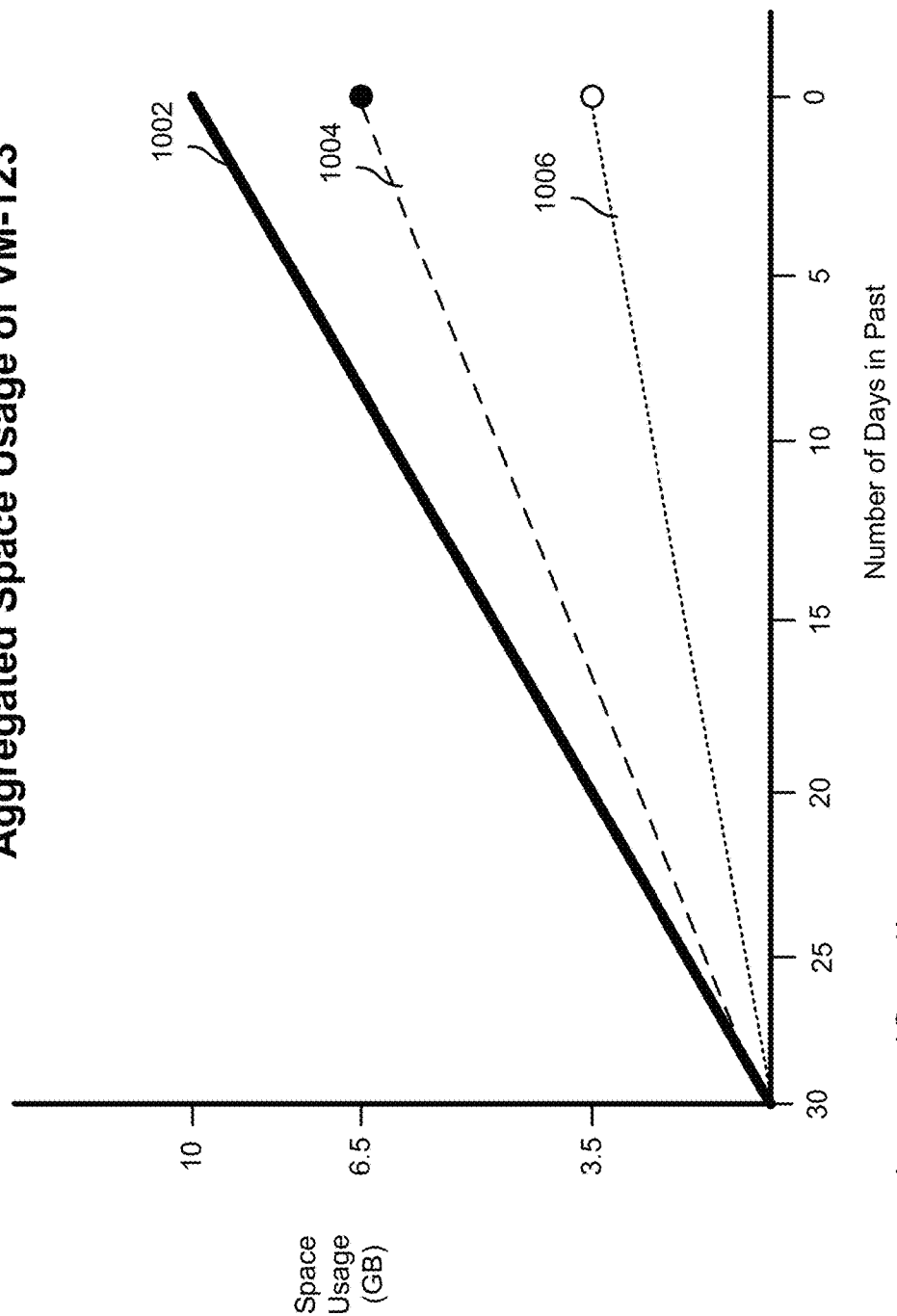
FIG. 10 describes an example of projecting the portion of the aggregated historical space usage values across various components of a VM that were stored at different storage devices that are attributable to a particular storage device.

FIG. 10 describes an example of projecting the portion of the aggregated historical space usage values across various components of a VM that were stored at different storage devices that are attributable to a particular storage device. In the example of FIG. 10, different components of VM-123 were simultaneously stored at Storage Device A and Storage Device B over the predetermined historical window of time of 30 days. If only a component of VM-123 is to be migrated from either Storage Device A or Storage Device B to another storage device, then the historical space usage values at each day within the last 30 days at either of Storage Device A or Storage Device B would need to be projected so that the projected historical space usage values can be used to determine the aggregated effective historical space usage data at the destination storage device, as described by the example process of process 700 of FIG. 7. The plot in FIG. 10 shows the known/stored aggregated space usage by VM-123 (line 1002) across both Storage Devices A and B at each predetermined interval, one day, within the past 30 days. As shown in the plot, the current aggregated space usage by VM-123 across Storage Devices A and B (the aggregated space usage at "0" days in the past) is 10 GB. The plot in FIG. 10 also stores the known/stored most recently received space usage values associated with the corresponding component of VM-123 that are stored at each of Storage Devices A and B. The plot in FIG. 10 further shows that components of VM-123 existed at both Storage Devices A and B over the entire past 30 days. The most recently received space usage value that is received from Storage Device A is 6.5 GB and the most recently received space usage value that is received from Storage Device B is 3.5 GB. In some embodiments, as described by the example process of process 900 of FIG. 9, the current ratio/breakdown of space usage among different components of VM-123 stored at different storage devices that is determined based on the aggregated space usage by VM-123 across Storage Devices A and B over the past 30 days and the recently received space usage values that are received from Storage Devices A and B, will be used to approximate the projected historical space usage values of corresponding components of VM-123 that have been stored at either of Storage Devices A or B. Given that the current aggregated space usage by VM-123 across both Storage Devices A and B is 10 GB, the current space usage of the component of VM-123 at Storage Device A is 6.5 GB, and the current space usage of the component of VM-123 at Storage Device B is 3.5 GB, it is estimated that 6.5/10 or 65% of the aggregated space usage value at each day within the past 30 days could be attributed to the component of VM-123 that was stored at Storage Device A and that 3.5/10 or 35% of the aggregated space usage value at each day within the past 30 days could be attributed to the component of VM-123 that was stored at Storage Device B. Line 1004 represents the projected historical space usage values of the component of VM-123 that was stored at Storage Device A over the past 30 days and line 1006 represents the projected historical space usage values of the component of VM-123 that was stored at Storage Device B over the past 30 days. Therefore, the projected historical space usage values associated with line 904 may be used at a destination storage device to which the component of VM-123 that was stored at Storage Device A was migrated and the projected historical space usage values associated with line 1006 may be used at a destination storage device to which the component of VM-123 that was stored at Storage Device B was migrated.

Figure 11:
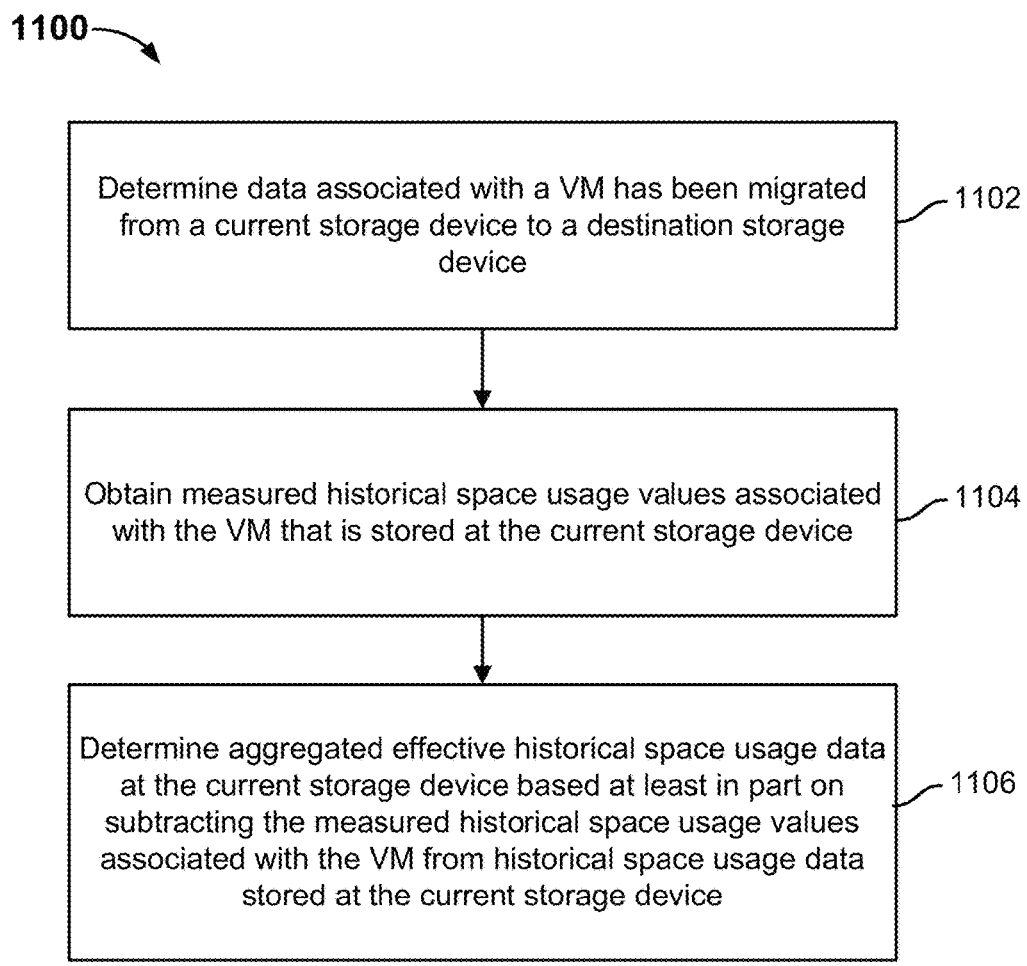
FIG. 11 is a flow diagram showing an example of a process for determining the effective historical VM space usage data at a current storage device with a removed VM.

FIG. 11 is a flow diagram showing an example of a process for determining the effective historical VM space usage data at a current storage device with a removed VM. In some embodiments, process 1100 is implemented by VM load balancing server 112 of system 100 of FIG. 1. In some embodiments, step 508 of process 500 of FIG. 5 is implemented, at least in part, using process 1100.

At 1102, it is determined that data associated with a VM has been migrated from a current storage device to a destination storage device. For example, a VM may be migrated off a current storage device as result of a load balancing processing determination.

At 1104, measured historical space usage values associated with the VM that is stored at the current storage device are obtained. The measured historical space usage values associated with the migrated VM (e.g., stored for each predetermined interval across at least a predetermined historical window of time) that is stored at the current storage device are obtained.

At 1106, aggregated effective historical space usage data at the current storage device is determined based at least in part on subtracting the measured historical space usage values associated with the VM from historical space usage data stored at the current storage device. The identified measured historical space usage values associated with the migrated VM are subtracted from the current historical space usage data stored at the current storage device to determine the aggregated effective historical space usage data at the current storage device so as to not influence (e.g., space usage) metric predictions at the current storage device that would be determined based on the aggregated historical space usage data at the current storage device since the VM will no longer be residing at the current storage device. For example, if a large VM, VM-456, had been consuming a significant amount of storage space at Storage Device A but was migrated off of Storage Device A, any space usage metric predictions that are to be made based on the stored aggregated historical space usage values stored at Storage Device A should not include the space usage history of VM-456 since VM-456 no longer resides at Storage Device A and can therefore no longer affect the future space usage trends at the current storage device. Unlike the addition of historical space usage data of VMs added to a current storage device, the historical space usage data of VMs that are removed from the current storage device does not need to be modified before they are removed from the aggregated historical space usage data of VMs stored at the current storage device. In some embodiments, while the historical space usage data of VMs that are removed/migrated away from the current storage device is subtracted from the current historical space usage data stored at the current storage device to determine the aggregated effective historical space usage data at the current storage device, the historical space usage data of VMs that are removed/migrated away is not necessarily deleted.

Figure 12:
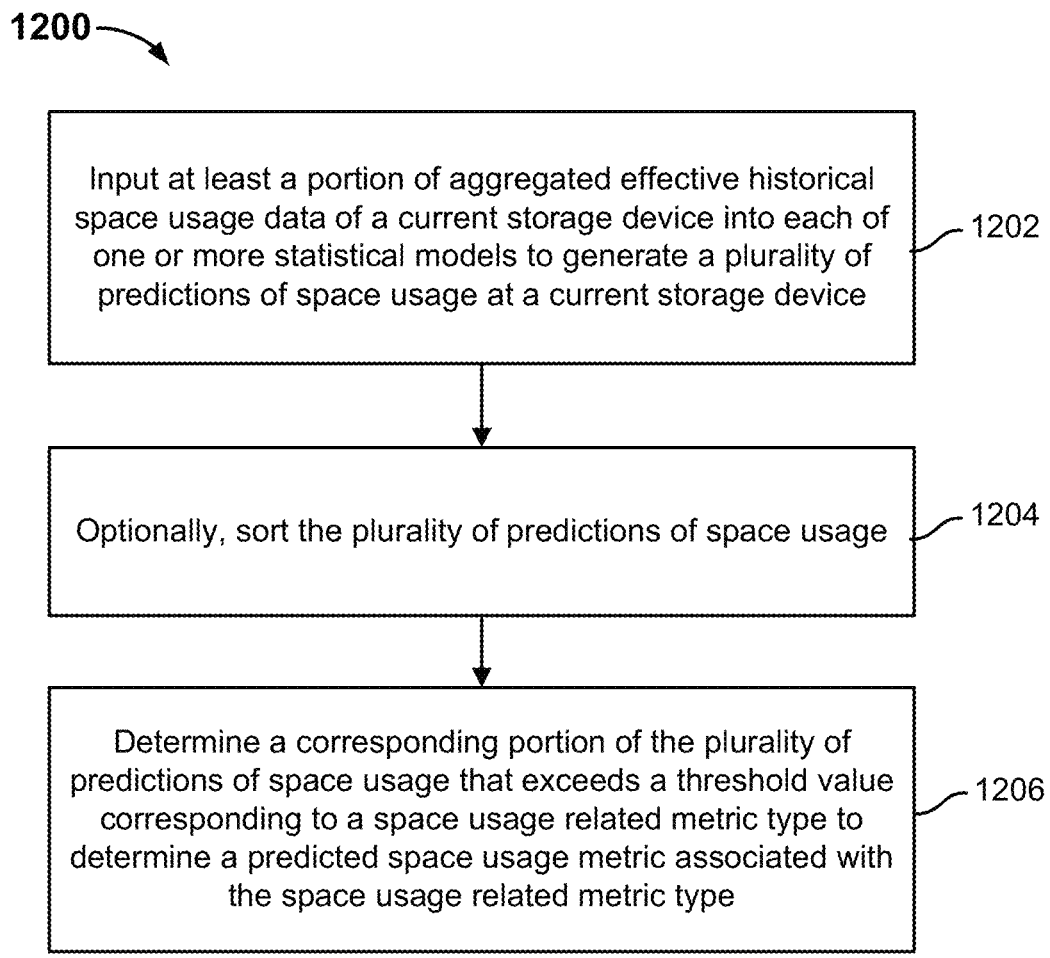
FIG. 12 is a flow diagram showing an example of a process for determining a predicted space usage metric associated with a current storage device.

FIG. 12 is a flow diagram showing an example of a process for determining a predicted space usage metric associated with a current storage device. In some embodiments, process 1200 is implemented by VM load balancing server 112 of system 100 of FIG. 1.

At 1202, at least a portion of aggregated effective historical space usage data of a current storage device is input into each of one or more statistical models to generate a plurality of predictions of space usage at a current storage device.

In various embodiments, samples of the aggregated effective historical space usage of a predetermined historical window of time (e.g., the past 30 days) are input into each of one or more different statistical models and the statistical models are configured to output various predictions of space usage across all the VMs that reside at the current storage device at any time in a predetermined window of time in the future (e.g., the next seven days). In some embodiments, different samples of the aggregated effective historical space usage of the past 30 days may be input into each statistical model more than once to receive different sets of outputs.

In some embodiments, multiple different statistical models are used to each output one or more sets of predictions of space usage across all the VMs that reside at the current storage device at any time in a predetermined window of time in the future (e.g., the next seven days). In some embodiments, a statistical model is sometimes referred to as a "component predictor" and the use of multiple component predictors is sometimes referred to as an "ensemble prediction."

In some embodiments, the three component predictors that are used include: linear regression over the course of the month (with normal noise distribution), linear regression over the past week (with a maximum over a normal distribution of noise), and Monte Carlo simulation, which will be described below in further detail.

In some embodiments, space prediction is run over the physical size used, both live and snapshots, per storage device.

In some embodiments, in order to run a "what if" scenario, the VM's size measurements are subtracted or added from the storage device history, adjusted by any bloating caused by moving snapshots or differences in data compression technology.

The following are a set of three example predictors that can be used as an ensemble to generate predictions of space usage at the current storage device:

Monte Carlo Simulation

The Monte Carlo simulation operates by generating outputs based using a subset of all samples. In order to generate a sample K time units in the future, the Monte Carlo predictor assumes that the change in size from time T to time T+1 is randomly chosen from the changes in size present in the training data.

Calculate the set S of differences between Space[T] and Space[T+1] for all T in the training data
Start with currentSize=Space[Tmax]
Loop K times:
Select a random element delta of S
currentSize+=delta
Return the maximum currentSize over the entire prediction (not just the last value.)

This model assumes that each time period is an independent sample, which does not seem to be true. As a result, it tends to predict sizes which are somewhat larger than actual data.

Linear Regression

The two linear regression predictors calculate a least-squares trend line over the training data, and use that plus some estimate of the residuals in order to make a range of predictions.

The least-squares linear regression operates on arrays X and Y. It is assumed that X=0, 1, 2, . . . , Tmax−1 for the time series data and Y=Space[X].

The following is example Python code that implements linear regression from the SciPy library:

xmean=mean(x,None) # average value, i.e., sum(x)/len(x)
ymean=mean(y,None)
xm,ym=x-xmean, y-ymean

```
r_num=np.add.reduce(xm*ym) # sum of products of cor-
    responding entries
r_den=np.sqrt(ss(xm)*ss(ym)) # ss=sum of squares, i.e.,
    sum(*i) for i in x
if r_den==0.0:
    r=0.0
else:
    r=r_num/r_den
    if (r>1.0):r=1.0 # from numerical error
slope=r_num/ss(xm)
intercept=ymean-slope*xmean
```

The determined slope and intercept are used to generate a prediction. The mean value of the prediction at K time steps after the training data PX=Tmax+K−1 is

```
mean_prediction=intercept+slope*PX
```

The variance around this mean is given by a product of the variance of the input, a correction factor, and a random value taken from the T distribution, with Tmax−2 degrees of freedom.

```
sigma2=var(y) # variance of y
num=(PX-xmean)**2
den=sum((x_i-xmean)**2 for x_i in x)
scale=math.sqrt(self.sigma2*(1+1.0/Tmax+num/den))
```

The variance of a sample is calculated as

```
var(y)=sum((y_i-ymean)**2 for y_i in y)/(len(y)-1)
```

Finally, a predicted value is generated as T*scale, where T is random.

For the first linear regression predictor, the monthly predictor, in some embodiments, a single data point is generated in this fashion for the last time point of the period.

For the second linear regression predictor, the weekly predictor, in some embodiments, a data point is generated for every time period in the prediction interval, and the maximum is taken. This gives the linear regression a better chance to "get lucky" and predict a high value. In some embodiments, it may be possible to improve the calculation of the weekly method by approximating max(T, T, T, . . . T) rather than generating K random variates.

In some embodiments, a corresponding predetermined number of outputs are obtained from each predictor.

At 1204, the plurality of predictions of space usage is optionally sorted.

In some embodiments, a corresponding predetermined number of outputs are obtained from each predictor based on a weight that is attributed to each predictor.

Once the predictions of space usage are obtained from the various predictors, they are included into a data structure (e.g., an array) and optionally, sorted from smallest to greatest.

Ensemble Prediction

None of the above predictors does particularly well on its own. Linear regression often predicts too low, and does not include enough variance. Monte Carlo simulation, as mentioned, tends to overshoot. Various combinations of these three predictors, and a few others, were examined on some sample data.

One of the criteria for a good predictor is that its range of predictions matches the range of outputs. So, if the predictor says that a range of values occurs about 10% of the time, then the actual values should fall within that range 10% of the time. It is irrelevant whether this is 10% at the top of the predicted range, at the bottom, or somewhere right in the middle.

Thus, the measure of the ensemble predictor is how well it approximates a uniform distribution of outcomes when the actual values are "bucketized" by their position in the predicted range. (For example, count how many actual values were within the 10% smallest range of predicted outcomes. This should be about 10% over a large number of experiments.) The chi-squared test was the tool that was used for checking whether two distributions match.

Using this metric, one of the best combinations that was found is described below:

45% weight to linear regression over the month

15% weight to linear regression over the past week, with multiple T samples as explained above 40% weight to Monte Carlo One example of creating an ensemble prediction is described as follows:

Take the total desired size N of the prediction, and divide it up according to the weights assigned to the individual predictors as N_i=W_i*N.

Run each individual predictor, generating N_i predictions as output.

Merge the predictions (unaltered) into a single array of size N, and sort them to generate a cumulative distribution function (CDF).

The size of the prediction is fixed (arbitrarily) at N=400. Larger samples can provide finer granularity in the CDF but not necessarily more accuracy given the large uncertainties involved.

Note that for the linear regression, a prediction about a threshold value may be generated without actually generating any samples.

In some embodiments, the number of samples to generate total and the number of samples to use from each predictor may be user configurable.

At 1206, a corresponding portion of the plurality of predictions of space usage that exceeds a threshold value corresponding to a space usage related metric type is determined to generate a predicted space usage metric associated with the space usage related metric type.

In various embodiments, each space usage related metric type corresponds to a percentage of the generated predictions of space usage that meet or exceed a particular threshold percentage of the total storage space at the current storage device.

The space threshold calculation uses the probability distribution computed at steps 1202 and 1204. The value of the metric for a particular storage device is equal to 1 minus the inverse CDF of the particular space threshold. (That is, what percentage of the predictions is above the threshold?) Higher predicted metrics are worse because they indicate a greater change that the space usage threshold will be met.

All the calculations should be done on physical usage, not logical.

The following table, Table 2, shows example space usage metric types and their corresponding space usage threshold percentages:

TABLE 2

| Metric Type | Space Usage Threshold |
| --- | --- |
| space_threshold_100 | 100% of storage device physical capacity |
| space_threshold_snapshots | 98% of storage device physical capacity |
| space_threshold_replicas | 95% of storage device physical capacity |
| space_threshold_90 | 90% of storage device physical capacity |
| space_threshold_80 | 80% of storage device physical capacity |

In some embodiments, the metrics are all bounded at 1%. For example, assume that the current storage device has 100 GB of total storage. "Space_threshold_100" refers to the percentage of space usage predictions that indicate that there is a probability that at any time in the next seven days, 100% of the storage space at the current storage device will be consumed. In another example, "space_threshold_snapshots" refers to the percentage of space usage predictions that indicate that there is a probability that at any time in the next seven days, 98% of the storage space at the current storage device will be consumed.

In some embodiments, in performing load balancing of VMs among storage devices that belong to a pool, a storage specific predicted metric data structure, that includes at least some space usage related predicted metrics, among other types of predicted metrics, is generated for each storage device in the pool, as will be described in further detail below.

Figure 13:
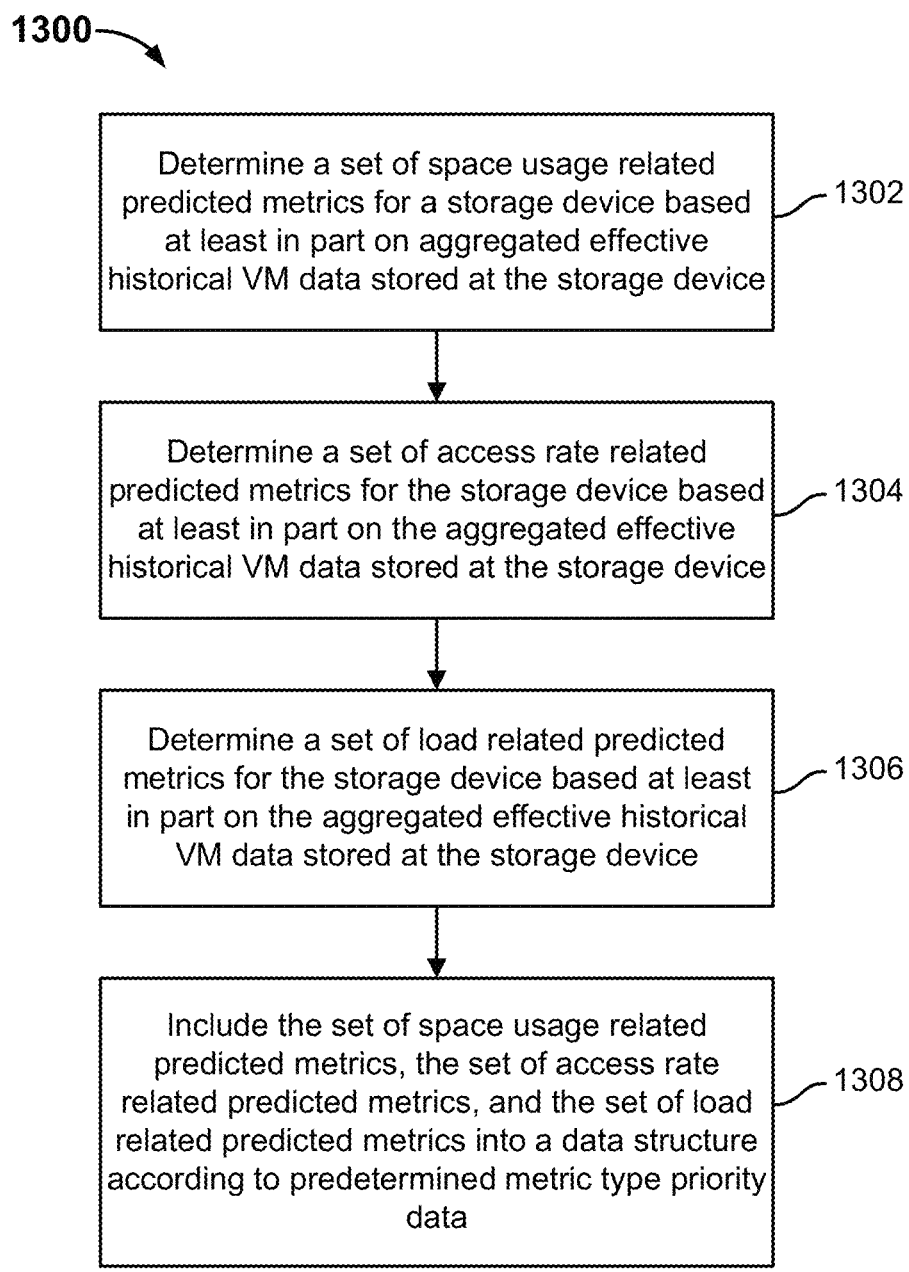
FIG. 13 is a flow diagram showing an embodiment of a process for determining a storage device specific predicted metric data structure.

FIG. 13 is a flow diagram showing an embodiment of a process for determining a storage device specific predicted metric data structure. In some embodiments, process 1300 is implemented by VM load balancing server 112 of system 100 of FIG. 1.

At 1302, a set of space usage related predicted metrics is determined for a storage device based at least in part on aggregated effective historical VM data stored at the storage device.

In various embodiments, the aggregated effective historical aggregated storage capacity (e.g., over the past 30 days or another configured period of time in the past) that was consumed by the one or more VMs that currently store data at a storage device is determined. For example, the historical aggregated storage capacity comprises a data point at each day (e.g., or another predetermined interval), where each data point represents a total amount of storage space that is used by the one or more VMs that store data at the storage device on that particular day.

In some embodiments, the aggregated effective historical storage capacity data is input into one or more statistical models that are configured to produce various predictions, based on the input data, on how much aggregated storage capacity will be consumed by the VMs at the storage device (e.g., at any point during the next seven days or another configured period of time in the future). At least a subset of the predictions will be sorted into a cumulative distribution function and predicted metrics corresponding to various space usage related metric types may be determined. Examples of space usage related metric types are space usage thresholds for which predicted metrics are computed as the percentage of predictions that are above the threshold of a metric type.

Table 1 below includes example thresholds for space usage metric types:

TABLE 1

| Metric Type Name | Space Usage Threshold |
| --- | --- |
| space_threshold_100 | 100% of storage device physical capacity |
| space_threshold_snapshots | 98% of storage device physical capacity |
| space_threshold_replicas | 95% of storage device physical capacity |
| space_threshold_90 | 90% of storage device physical capacity |
| space_threshold_80 | 80% of storage Device physical capacity |

In some embodiments, the predicted metrics are bounded at 1%. In some embodiments, the predicted metrics are also bounded above at 99% so that the pool metric does not saturate at 1.

In some embodiments, a space usage related predicted metric comprises a single value (a probability). In some embodiments, a space usage related predicted metric comprises a range of values (e.g., a range of probabilities, which is sometimes referred to as a "confidence interval"). For example, the confidence interval may be determined based on a Wilson interval and the computed percentage of predictions that is greater than a space threshold of a metric type. For example, the confidence interval may be determined based on adding to and also subtracting from the computed percentage of predictions that is greater than a space threshold of a metric type.

At 1304, a set of access rate related predicted metrics for the storage device is determined based at least in part on the aggregated effective historical VM data stored at the storage device.

In various embodiments, the aggregated effective historical flash accesses and disk accesses (e.g., over the past seven days or another configured period of time in the past) that were made for requests to the one or more VMs that currently store data at a storage device are determined. For example, the historical aggregated flash accesses and disk accesses comprise a histogram of how many accesses were made to each block in flash and each block in disk (or any block in disk) in the past seven days. In some embodiments, the measured flash hit rate associated with the past seven days may be determined as the number of accesses to flash divided by the sum of the number of accesses to flash plus the number of accesses to disk. In some embodiments, the measured flash miss rate is determined by subtracting the flash hit rate from one (or determining the number of accesses to disk divided by the sum of the number of accesses to flash plus the number of accesses to disk). Examples of access rate related metric types include the greater of the measured flash miss rate and a predetermined flash miss rate (e.g., the maximum function with the measured flash miss rate and a predetermined flash miss rate as arguments).

Table 2 below includes example thresholds for access rate metric types:

TABLE 2

| Metric Type Name | Computation |
| --- | --- |
| flash_overcommit_97 | max( miss_rate, 0.03) |
| flash_overcommit_99 | max( miss_rate, 0.01) |
| flash_overcommit_999 | max( miss_rate, 0.001 ) |

At 1306, a set of load related predicted metrics for the storage device is determined based at least in part on the aggregated effective historical VM data stored at the storage device.

In various embodiments, the read and write IOs per second (IOPS) and read and write bytes per second (throughput) are the main historical data that is used to calculate load. In some embodiments, one or more of additional measurements such as average block size, or measures of compressibility and dedupability of the data, can also be used to build a more sophisticated measure of the load placed on each storage device.

The selected inputs are combined into a single "load" measure that nominally ranges from 0 to 100% (though in some cases it could exceed 100%), where 100% is the maximum expected performance of the array.

The metrics based on this measure are "percent of time periods that were over a given load value." Examples of a given load value include 40%, 60%, and 80% load. For example, load_60 metric is max(time periods over 60% load/the number of time periods in training period, 0.01).

At 1308, the set of space usage related predicted metrics, the set of access rate related predicted metrics, and the set of load related predicted metrics are included in a data structure according to predetermined metric type priority data.

In various embodiments, each determined predicted metric (e.g., space usage related, access rate related, and load related) is inserted into a data structure corresponding to the storage device in a manner in which a predicted metric is added to an element of the data structure that reflects the priority associated with the corresponding metric type. For example, the data structure corresponding to the storage device is a vector (e.g., a one-dimensional array), in which case the predicted metric associated with the highest priority metric type may be included in the first element of the vector, and the second highest priority metric type may be included in the second element of the vector, and so forth.

The following are example priorities and related goals, listed from highest to lowest priorities:

1. Space capacity. Ensure that no storage device runs out of space (e.g., prevents the scenario in which a storage device has 100% of its storage capacity consumed). If a message associated with insufficient space capacity is returned to the hypervisor in response to a write to a VM, then the VM experiences an I/O error. Usually, the I/O error will cause the VM to stop functioning and requires an immediate intervention.

2. Data protection. Preserve data protection policies (e.g., replication, snapshot, high-frequency snapshots). In some embodiments, a storage device will cease taking snapshots above a threshold space usage (e.g., 98%) and cease accepting replicas above a lower space threshold (e.g., 95%). If the VM cannot be snapshotted or replicated due to resource constraints, the user may experience data loss at a later date.

3. Guaranteed Quality-of-Service (QoS). Ensure that VMs which have guaranteed QoS can receive the desired minimum normalized IOPS. If a VM experiences high latency due to contention for resources with other VMs, the end user may see application slowdown should the system be oversubscribed. If the storage device user is a service provider, then the service provider's customers are not receiving the guaranteed "floor" that they have paid for. This situation, while requiring attention, typically does not require as high a level of escalation as missed backups or malfunctioning VMs that are associated with a lack of storage space.

4. Best-effort QoS. Attempt to reduce the number of flash misses by analyzing working-set behavior and moving VMs to where there is available flash. VMs that experience high latency but have no QoS protection are still undesirable. The goal is that as long as resources exist somewhere within the pool, no VM should suffer. For example, the VM load balancing server should seek to avoid flash misses.

5. Topology-induced latency. An attempt to eliminate "hot spots" of high IOPS or throughput. Provide consistent performance to VMs. VMs should ideally be placed so that their network connection to the host they are running on is good. For example, it is not desirable to move a VM to a separate rack from its storage.

In various embodiments, each of the above user priorities match up with one or more metric types for which predicted metrics are included in a predicted metric data structure. In some embodiments, user priority 2) corresponds to two different thresholds in a predicted metric data structure: snapshots stopping, and replication stopping. User priority 4) mentions only flash explicitly, but load metrics also seek to satisfy these user requirements, so, in some embodiments, user priority 4) matches 4 metric types in a predicted metric data structure.

In some embodiments, low-priority versions of these metrics (with lower thresholds) are added in a predicted metric data structure to aid in tiebreaking.

In some embodiments, users of a pool of storage devices may be enabled to configure different priorities and/or relative priorities for their pool.

Figure 14:
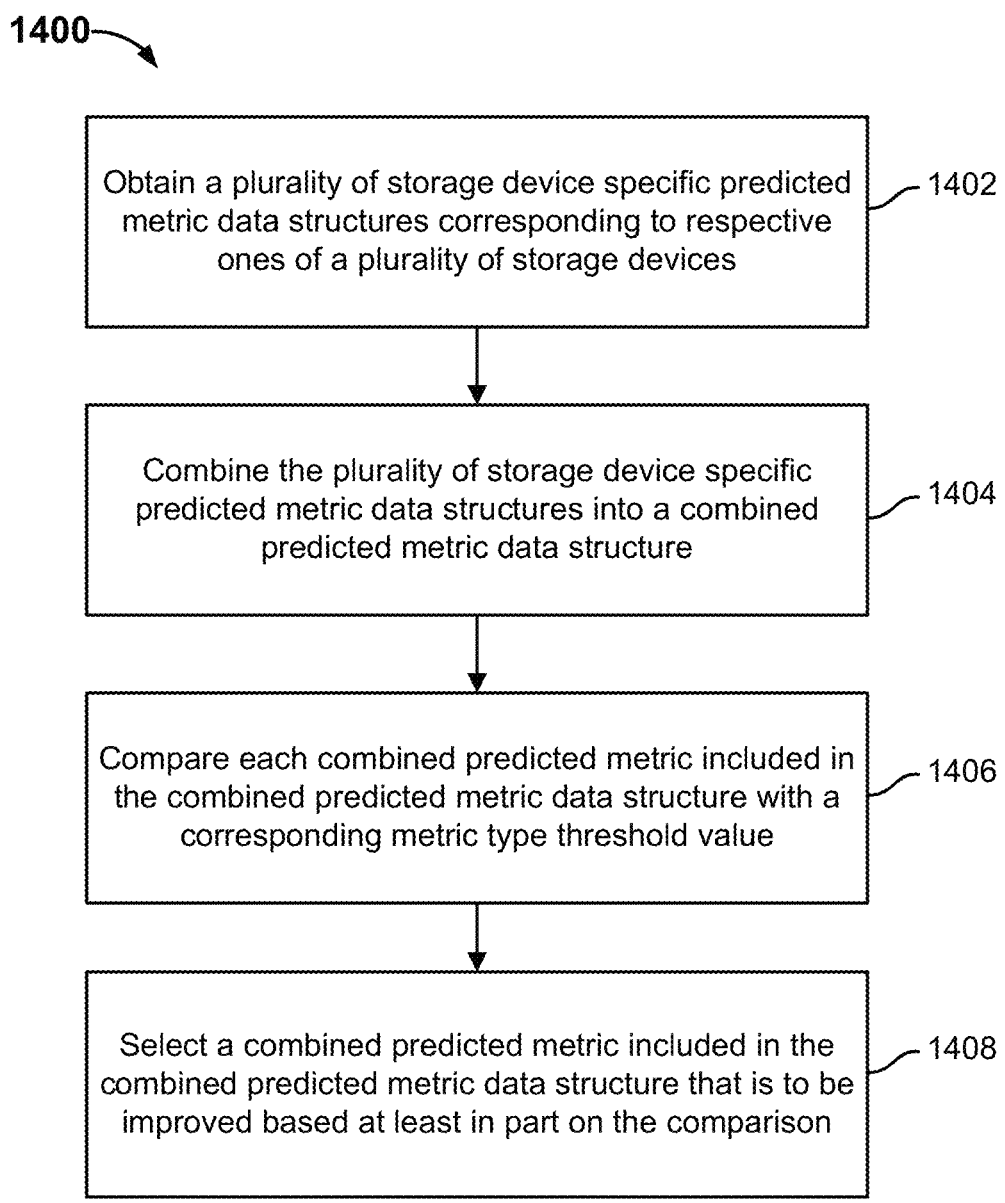
FIG. 14 is a flow diagram showing an embodiment of a process for determining a combined, pool-level predicted data structure.

FIG. 14 is a flow diagram showing an embodiment of a process for determining a combined, pool-level predicted data structure. In some embodiments, process 1400 is implemented by VM load balancing server 112 of system 100 of FIG. 1.

At 1402, a plurality of storage device specific predicted metric data structures corresponding to respective ones of a plurality of storage devices is obtained. In some embodiments, a process such as process 1300 is implemented to obtain a storage device specific predicted metric data structure for each storage device that belongs to a pool of storage devices.

At 1404, the plurality of storage device specific predicted metric data structures is combined into a combined predicted metric data structure. The combined predicted metric across the predicted metrics associated with the same metric type from each storage device specific data structure is the probability that the pool, as a whole, will encounter the undesirable event (e.g., reaching 100% of space usage) associated with the metric type. In various embodiments, the storage device specific predicted metric data structures are combined to form a combined, pool-level predicted metric data structure by determining a joint probability across the predicted metrics associated with the same metric type from each storage device specific data structure.

For example, there are n storage devices in a pool, P1 is the predicted metric (probability) that Storage Device 1's space usage is going to reach 100% storage capacity, P2 is the predicted metric (probability) that Storage Device 2's space usage is going to reach 100% storage capacity, . . . and Pn is the predicted metric (probability) that Storage Device n's space usage is going to reach 100% storage capacity. As such, (1-P1) is the probability that Storage Device 1's space usage is not going to reach 100% storage capacity, (1-P2) is the probability that Storage Device 2's space usage is not going to reach 100% storage capacity, . . . and (1-Pn) is the probability that Storage Device n's space usage is not going to reach 100% storage capacity. Therefore, the joint probability that at least one storage device in the pool's space usage is going to reach 100% storage capacity is:

$$1-(1-P1)(1-P2)\ldots(1-Pn) \quad (1)$$

Formula (1) indicates that a change in even one of the predicted metrics (e.g., if the predicted metric (probability) that a storage device's will reach 100% storage capacity lowers) will improve the combined, pool-level predicted metric.

In the event that a predicted metric comprises a range of probabilities (instead of a single probability value), the joint probability for predicted metrics of storage devices of a pool may be computed as follows: compute a first joint probability of all the upper limits of the predicted metrics and a separate, second joint probability of all the lower limits of the predicted metrics and use the first and second joint probabilities as the endpoints of the combined predicted metric.

In some embodiments, bounding the storage device specific predicted metrics probabilities below 0.99 ensures that the combined, pool-level probability does not saturate at 1.0.

For example, in a 10 storage device pool with five storage devices at a threshold and five below the threshold, the calculated value would be:

$$1-(1-0.99)^5(1-0.01)^5=0.99999999990490099501$$

So if a change increases the probability on one of the storage devices to 0.02, there is a detectable difference:

$$1-(1-0.99)^5(1-0.01)^4(1-0.02)=\\0.99999999990586159102$$

That is, even with some storage devices above the threshold, causing others to breach it is still worse.

In some embodiments, each combined predicted metric is stored in the format of 1-ε format, where ε is (1-P1)(1-P2)...(1-Pn) to maintain more precision in the combined predicted metric.

At 1406, each combined predicted metric included in the combined predicted metric data structure is compared with a corresponding metric type threshold value.

In various embodiments, each combined predicted metric is compared to a predetermined threshold value corresponding to its metric type. For example, the combined predicted metric for reaching 100% of storage capacity at one or more VMs is compared against the predetermined threshold value for reaching 100% of storage capacity.

An example predetermined threshold value for any of the combined predicted space usage related metric types is 0% because no chance of running out of space is acceptable.

An example predetermined threshold value for any of the combined predicted load related metric types is 1% because some heavy load may be acceptable (e.g., a few hours per week).

A predetermined threshold value may be selected for each of the combined predicted access rate related metric types. For example, the combined 97% flash hit rate metric has a corresponding predetermined threshold of 3% misses, the combined 99% flash hit rate metric has a corresponding predetermined threshold of 1% misses, and the combined 99.9% flash hit rate metric has a corresponding predetermined threshold of 0.1% misses.

The values of predetermined thresholds could be made higher to reduce the number of recommendations, in case they are too noisy or are perceived as only solving lower-probability events.

At 1408, a combined predicted metric included in the combined predicted metric data structure that is to be improved based at least in part on the comparison is selected.

A combined, pool-level predicted metric that exceeds a corresponding predetermined threshold value is determined to be a "problem" metric and one that the VM load balancing server will attempt to improve via recommending one or more VMs to be migrated among storage devices within the pool, as will be described in further detail below.

FIG. 15 is a diagram showing a combined predicted metric data structure. In the example of FIG. 15, the combined predicted metric data structure is combined predicted metric vector 1500. Each combined predicted metric of combined predicted metric vector 1000 that is selected to be improved (e.g., having a combined predicted metric that is greater than a corresponding threshold value) is shown in bolded text. As such, in the example of FIG. 15, the combined space usage related metric 1, combined space usage related metric 3, and combined access rate related metric 6 are each determined to be improved and therefore, selected to be used to determine and recommend which VMs to migrate among storage devices of the pool. An example processing for improving a combined, pool-level predicted data structure is described in FIG. 16, below. In some embodiments, in the event that there are multiple selected combined predicted metrics to be improved, then VMs are selected to be migrated among a pool of storage devices for each selected combined predicted metric, starting with the one corresponding to the metric type of the highest priority and proceeding to each other of the selected combined predicted metrics in the order of their descending priorities.

Figure 16:
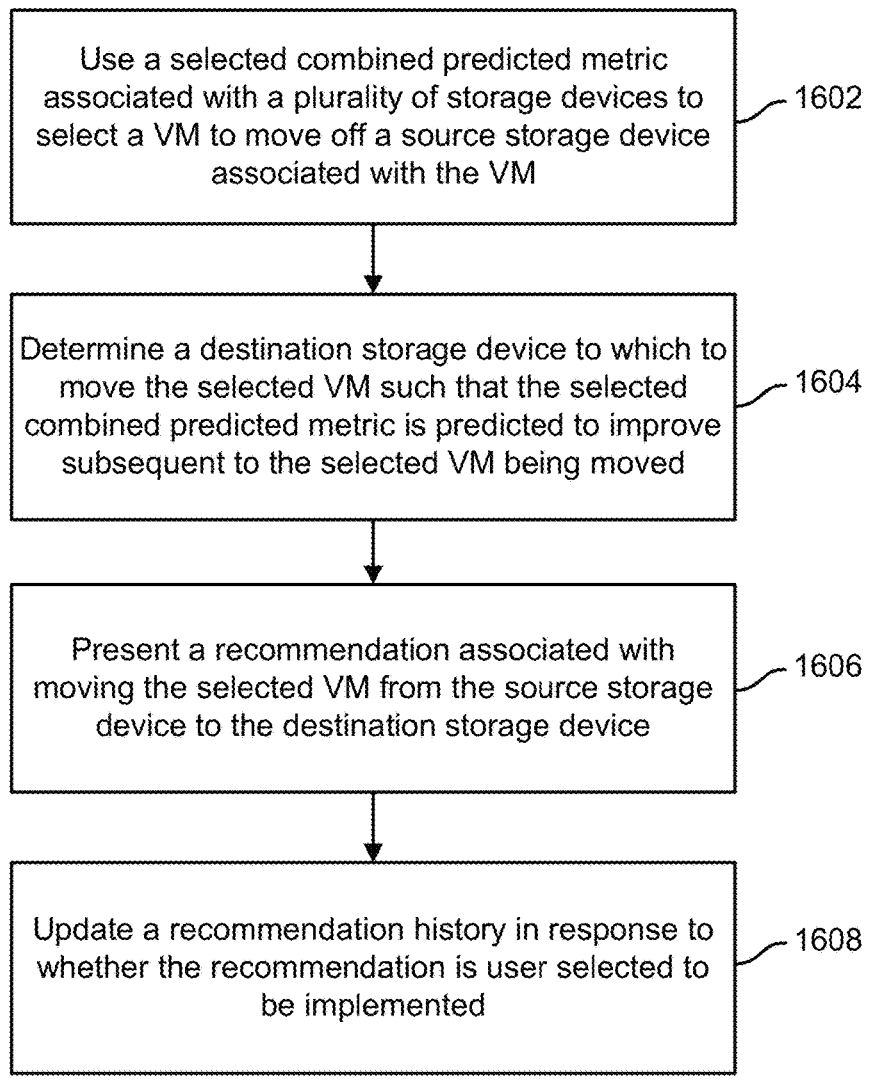
FIG. 16 is a flow diagram showing an example process for determining a combined, pool-level predicted data structure.

FIG. 16 is a flow diagram showing an example process for determining a combined, pool-level predicted data structure. In some embodiments, process 1600 is implemented by VM load balancing server 112 of system 100 of FIG. 1.

In some embodiments, process 1600 is repeated for each selected combined predicted metric.

At 1602, a selected combined predicted metric associated with a plurality of storage devices is used to select a VM to move off a source storage device associated with the VM. A selected combined predicted metric for a pool of storage devices is used to select one or more candidate sets of VMs to move off of their current source storage devices. In some embodiments, a candidate set of VMs to move off their current source storage device(s) is selected for the selected combined predicted metric if it is determined that in a hypothetical (what-if) scenario, that after the candidate set of VMs is moved off their current source storage device(s), the updated combined predicted metric that is computed for the corresponding metric type is improved (e.g., the probability of reaching the undesirable event associated with the metric type is lowered). For example, if the selected combined space usage related metric was a 90% probability that at least one storage device in the pool is going to reach 100% space usage, then a candidate set of VMs may be selected such that if such a set of VMs were removed from their current storage devices (without taking into consideration which destination storage device(s) they would be moved to), the probability that at least one storage device in the pool is going to reach 100% space usage is going to be lower (e.g., by a statistically significant amount) than 90%. An example process of selecting candidate sets of VMs for each selected combined predicted metric is described in FIG. 17, below.

At 1604, a destination storage device to which to move the selected VM is determined such that the selected combined predicted metric is predicted to improve subsequent to the selected VM being moved. In some embodiments, it is determined which destination storage device a set of VMs to which a selected set of VMs is to be migrated based on constraints associated with user assigned rules, constraints associated with storage device attributes, and which destination storage device is predicted to improve the combined predicted metric vector the most, with respect to the metric types of the highest priorities. An example process of determining which destination storage device to move a selected set of VMs is described in FIG. 18, below.

In some embodiments, it is acceptable to make combined predicted metrics lower on the priority list worse in order to improve combined predicted metrics higher on the priority list. In some embodiments, it also acceptable to bound a particular level of service as "good enough" so that items further down the list can be optimized.

In some embodiments, recommendations should take into account the cost of moving VMs both in network traffic and disruption to the users. If an equally good result can be satisfied by moving VMs which are smaller, less I/O-intensive, or powered off, the recommendation generation process should identify the optimal set of VMs to move.

In some embodiments, if the projected costs of moving VMs exceed the potential benefit, no recommendation should be provided.

In some systems, the number of concurrent storage migration operations per storage device is limited, and this limit should be respected. The VM load balancing server should seek to identify VMs that span multiple storage devices and multiple destination storage devices in order to spread load.

In some embodiments, the recommendation modelling should estimate the effects of moving VMs between storage devices which compress for capacity and those which do not, and between flash (which dedupe for capacity) and hybrid models (which do not dedupe for capacity).

Two storage devices may not be anywhere close to a space usage threshold and yet one is more "full" than the other, either in load or capacity. In various embodiments, VM load balancing goals in this case are:

Get "ahead of the game" by using empty storage devices in preference to fuller storage devices. Avoid moving a VM on a storage device only to have to move it off a few weeks later, or leaving an empty storage device unused.

Preserve some open space for initial placement.

Allow moving beyond perfectly balancing space in order to balance load as well.

If one potential target has 25% capacity and 10% load used, and another has 20% capacity and 20% load, then it is noted that the difference in capacity is smaller than the difference in load, so load should dominate.

In some embodiments, a new metric that combines the two measurements may be added to the combined predicted metric data structure. For example, one possible solution is to sum 1/(1-capacity percentage)+1/(1-load percentage) across all storage devices. This prioritizes increasingly low percentages. In some embodiments, combined predicted metrics are ignored and VMs are stochastically distributed in a way that tends to promote balance. In the example above, several VMs may need to be moved but not all of them should be put on the same storage device. Each storage device could instead be assigned a weight based on predicted capacity and load, and in case the combined predicted metric is tied, randomly choose a destination storage device proportional to those weightings.

At 1606, a recommendation associated with moving the selected VM from the source storage device to the destination storage device is presented. A recommendation that identifies at least the selected set of VMs to move, the destination storage device to which to move the set of VMs, and the combined predicted metric (e.g., associated with the highest priority) that is predicted to be improved after the move is generated and presented at a user interface. A user may select to implement the recommendation or ignore the recommendation and/or provide a reason for his or her action.

Any VM selected as part of the recommendation must improve at least one of the selected combined predicted metrics to improve. The combined predicted metrics that were not selected to be improved only inform VM and storage device choice and in some embodiments, these metrics will not be visible to the user.

At 1608, a recommendation history is updated in response to whether the recommend is user selected to be implemented. Whether the recommendation was approved by a user to be implemented is stored in the recommendation and may be used to determine subsequent recommendations.

In some embodiments, the VM load balancing server is configured to self-measure the accuracy and impact of its predictions. If a prediction is made for the expected space consumption, IOPS, or flash usage on a storage device and no load balancing actions are taken, those predictions can be checked (e.g., updated based on newly available historical data) over the next week. If a load-balancing operation is performed based on a prediction of post-migration behavior, then the prediction associated with that load-balancing operation can also be checked. In various embodiments, the results of this self-analysis would feed back to the user in the form of a "confidence level" in subsequent predictions. In some embodiments, some or all of this information is sent back to the user at the user interface, in the form of predictive model output or retrospective analysis of recommendations.

Figure 17:
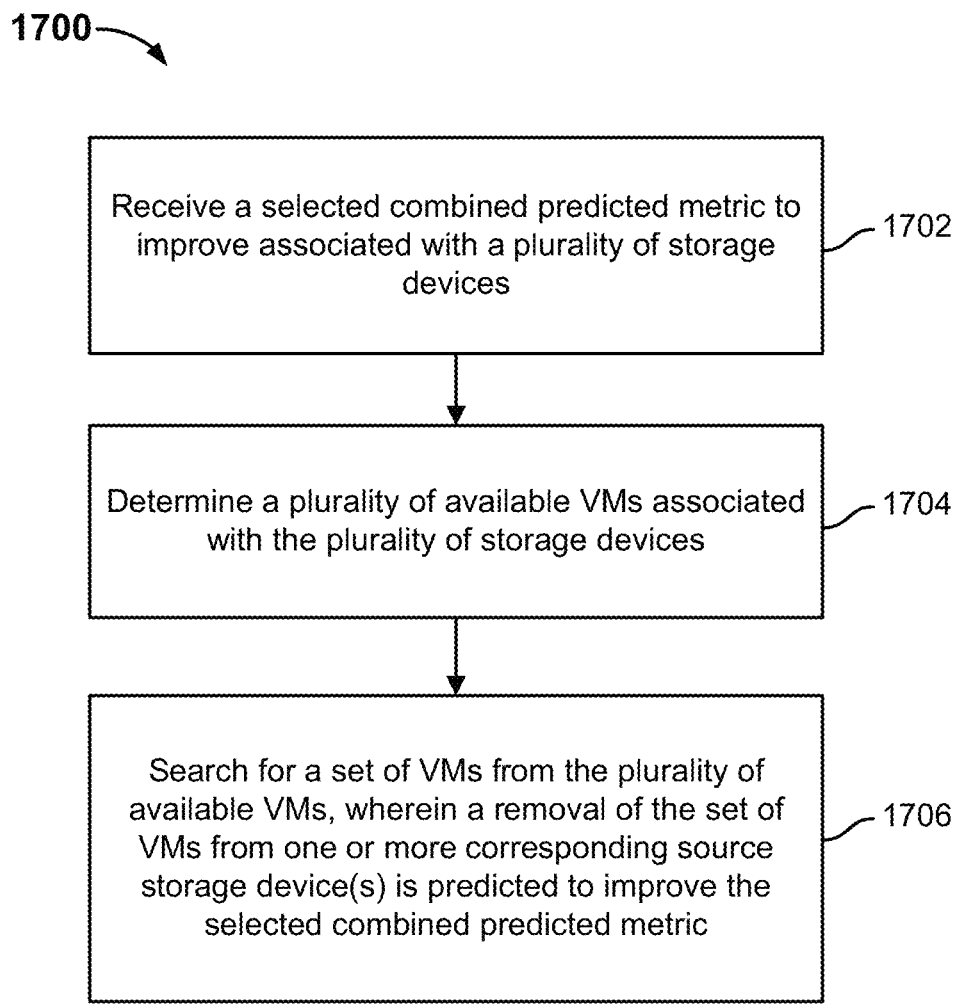
FIG. 17 is a flow diagram showing an example process for selecting a candidate set of VMs to migrate off their source storage devices for a selected combined predicted metric.

FIG. 17 is a flow diagram showing an example process for selecting a candidate set of VMs to migrate off their source storage devices for a selected combined predicted metric. In some embodiments, process 1700 is implemented by VM load balancing server 112 of system 100 of FIG. 1. In some embodiments, step 1602 of process 1600 of FIG. 16 may be implemented at least in part using process 1700.

At 1702, a selected combined predicted metric to improve associated with a plurality of storage devices is received. Process 1700 may be performed for each selected combined predicted metric to improve that is associated with a pool of storage devices. For example, returning to the example of FIG. 15, any one of combined space usage related metric 1, combined space usage related metric 3, and combined access rate related metric 6 may be received at 1702.

At 1704, a plurality of available VMs associated with the plurality of storage devices is determined. In various embodiments, the available VMs of the pool are those VMs that are not restricted from being migrated from their current storage devices. In some embodiments, restrictions on a VM from being migrated from their current storage device include user provided rules, the inclusion of the VM in a previously generated recommendation (e.g., the VM has already been committed to migrate to a determined destination storage device in the previously generated recommendation), and storage device attributes. For example, a user provided rule is that "VM-123" is to always run on Storage Device A or that no VM should be moved from a datastore at one subdirectory to a datastore with a different subdirectory. For example, a previously generated recommendation that was determined for combined predicted space usage related metric 1 includes moving "VM-123" to Storage Device D and as such, "VM-123" is no longer available when determining sets of VMs to migrate for combined predicted space usage related metric 3.

At 1706, a set of VMs from the plurality of available VMs is searched for, wherein a removal of the candidate set of VMs from one or more corresponding source storage device(s) is predicted to improve the selected combined predicted metric. In some embodiments, of the available VMs, sets of one or more VMs are determined such that it in a hypothetical (what-if) scenario in which each VM of a set is removed (i.e., the historical VM data of that VM is removed) from their respective source storage devices, the recomputed combined, pool-level predicted metric data structure will include an updated combined predicted metric associated with the metric type of the selected combined predicted metric that is received at step 1702 that is better than the selected combined predicted metric received at step 1702. Computing the updated combined, pool-level predicted metric data structure may be determined using a process such as process 1400 of FIG. 14. For example, if the selected combined predicted metric is a 90% probability that at least one storage device will reach 100% space usage (e.g., in the next seven days) and it is predicted that if both VMs "VM-123" and "VM-456" are moved off their current storage device (Storage Device B), there will only be a 70% probability that at least one storage device will reach 100% space usage, then VMs "VM-123" and "VM-456" will be determined to be a set of VMs at step 1706.

Figure 18:
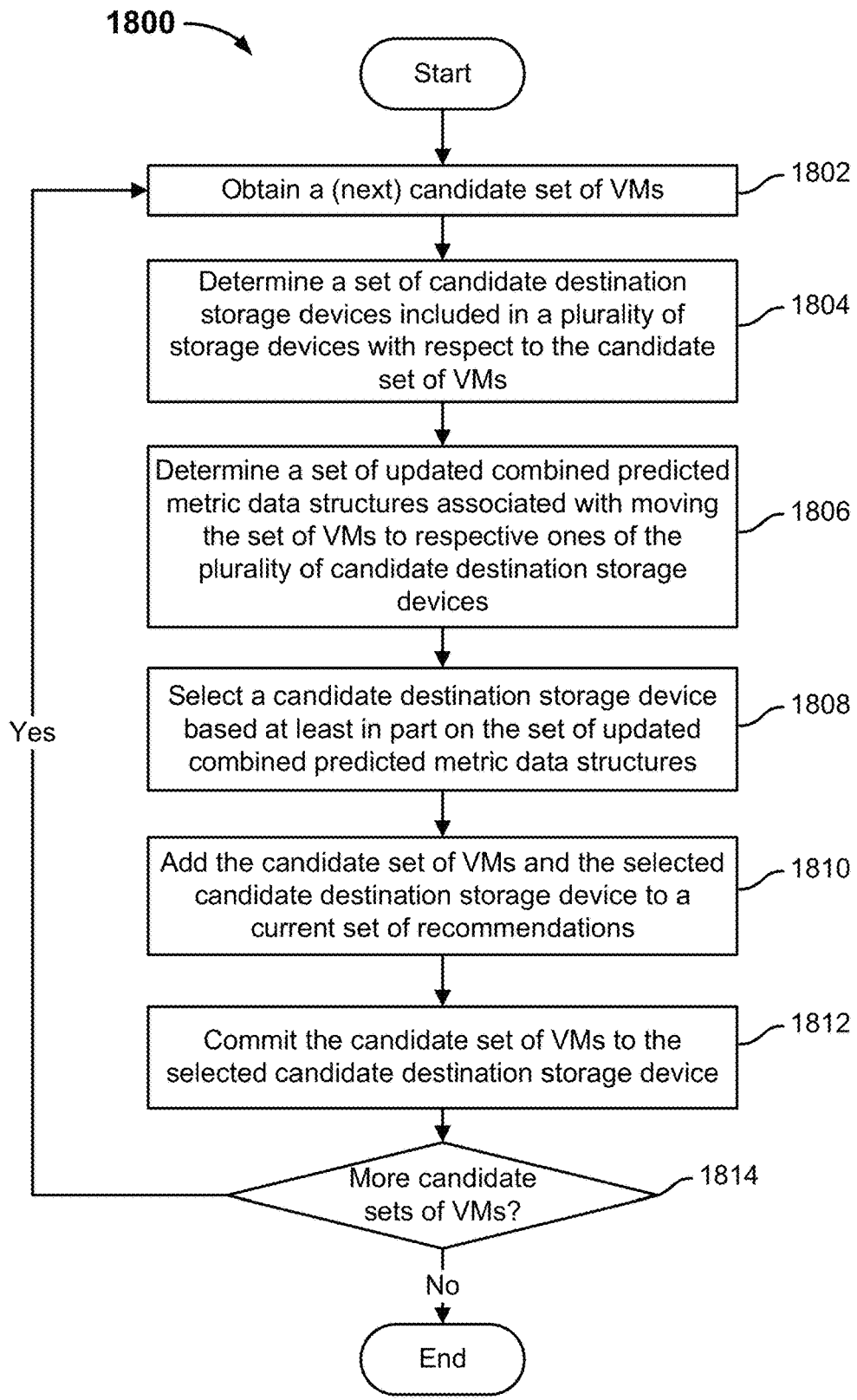
FIG. 18 is a flow diagram showing an example process for selecting a candidate destination storage device to which to recommend moving a set of VMs.

FIG. 18 is a flow diagram showing an example process for selecting a candidate destination storage device to which to recommend moving a set of VMs. In some embodiments, process 1800 is implemented by VM load balancing server 112 of system 100 of FIG. 1. In some embodiments, step 1604 of process 1600 of FIG. 16 may be implemented at least in part using process 1800.

Process 1800 describes an example process of selecting a candidate destination storage device to move a selected set of VMs to, to improve a current, selected combined predicted metric associated with a pool of storage devices. As will be described below, pairs of sets of VMs and candidate destination storage devices are looped over at the same time, and the pair of the set of VMs and the corresponding candidate destination storage device that is associated with the best updated combined predicted metric data structure are selected.

At 1802, a plurality of sets of VMs to potentially move is obtained. In some embodiments, each set of VMs may be determined for the current, selected combined predicted metric by a technique such as step 1706 of process 1700 of FIG. 17.

For example, sets of VMs Set A, Set B, and Set C are generated.

At 1804, a plurality of candidate destination storage devices to which at least one set of VMs included in the plurality of sets of VMs is allowed to move is determined. In various embodiments, a candidate destination storage device comprises a storage device within the pool of storage devices to which all VM of at least one set of VMs is permitted to (e.g., based on stored affinity rules) move. In some embodiments, all of the VMs in a set are to be moved to the same destination storage device.

Returning to the example above, destination candidate storage devices included in the pool of storage devices D1, D2, and D3 are determined because at least one of sets of VMs Set A, Set B, and Set C is permitted to move to each of D1, D2, and D3.

At 1806, a corresponding updated combined predicted metric data structure associated with moving each set of VMs to each candidate destination storage device to which the set of VMs is allowed to move is determined. For each combination or pair of a set of VMs and a candidate destination storage device, a hypothetical (what-if) scenario is generated in which that particular set of VMs is removed from their corresponding source storage devices (e.g., the VMs of the candidate sets may reside on the same or different source storage devices) and then migrated to that particular candidate destination storage device. In each hypothetical (what-if) scenario, the historical data of each VM of that set is removed from their corresponding source storage devices and then added to that particular candidate destination storage device. In each hypothetical (what-if) scenario, an updated combined, pool-level predicted metric data structure is computed for that pair of a set of VMs and a candidate destination storage device based on the hypothetical migration of the set of VMs. Computing the updated combined, pool-level predicted metric data structure may be determined using a process such as process 1400 of FIG. 14.

Returning to the example above, an updated combined, pool-level predicted metric data structure may be determined for each of the following eight pairs of a set of VMs and a candidate destination storage device (that the set of VMs is permitted to move to):

Set A moves to D1
Set A moves to D2
Set A moves to D3
Set B moves to D1
Set B moves to D2
Set B moves to D3
Set C moves to D2 (in this example, Set C is not permitted to move to D1)
Set C moves to D3

At 1808, a pair including a selected candidate destination storage device and a selected set of VMs to move to the selected candidate destination storage device to is selected based at least in part on the corresponding updated combined predicted metric data structures. In various embodiments, the pair of the set of VMs and the corresponding candidate destination storage device that yields the best (e.g., lowest probability) combined predicted metric corresponding to the highest priority is selected as the most desirable pair of selected candidate destination storage device and the selected set of VMs to move that selected candidate destination storage device to be recommended. In the event that there are two or more tied pairs of sets of VMs and corresponding candidate destination storage devices (e.g., candidate destination storage devices for which the respective updated combined predicted metric data structures are tied), then one or more tiebreaker rules may be used to select one of the pairs of a set of VMs and corresponding candidate destination storage devices. For example, a tiebreaker rule may dictate to select the pair of a set of VMs and the corresponding candidate destination storage device that either has the most remaining storage usage and/or the candidate destination storage device for which the least amount of bytes will be required to be moved.

Returning to the example above, of the eight evaluated potential moves of sets of VMs, moving Set B to storage device D2 is determined to yield the updated combined predicted metric data structure that includes the moved improved (best) combined predicted metric associated with the highest priority.

At 1810, the pair including the selected set of VMs and the selected candidate destination storage device is added to a current set of recommendations.

At 1812, the selected set of VMs is committed to the selected candidate destination storage device. Committing the candidate set of VMs to the selected candidate destination storage device includes preventing any VM of the candidate set from being included in a subsequently generated recommendation. As such, in some embodiments, subsequently generated recommendations do not include overlapping VMs as previously generated recommendations.

In some embodiments, a pair of a set of VMs and a corresponding candidate destination storage device cannot be selected if the proposed move makes a higher-priority combined predicted metric worse, even if it improves the current, selected combined predicted metric. In the event that none of the combinations of sets of VMs and corresponding candidate destination storage devices is satisfactory, no recommendation will be made to move any set of VMs to a corresponding candidate destination storage device for the current, selected combined predicted metric to improve.

In some embodiments, only recommendations associated with improving the worst (i.e., highest-priority) of the combined predicted metrics that were selected to be improved are presented to a user, even if the recommendations improve some of the lower priority combined predicted metrics as well.

In Examples 1 through 6 described below, Storage Device [x] refers to the source storage device from which one or more VM(s) are recommended to move off and Storage Device [y] refers to the destination storage device to which the one or more VM(s) are recommended to move. While Examples 1-6 below do not show the set of VMs that is suggested to move from the source (Storage Device [x]) to the destination (Storage Device [y]), in practice, the suggested VM(s) to move may be presented with the recommendation at the same or a different user interface. For example, in some instances, a single user interface may describe the following for each recommendation:

a) What issues were detected (what problem metrics exist on which storage device(s))?
b) Which VMs will be moved (and a source and destination for each VM)?
c) What will be the predicted outcome after successful migration?

Example 1

| | |
|---|---|
| Combined Predicted Metric Type | space_threshold_100 |
| Explanation for VM Migration | Storage Device [x] has a [p]% chance of running out of space within the next week. This will cause VMs running on this storage device to fail due to SCSI write errors. |
| Backup Data | Storage Device [x] is currently [q]% full ([s]TiB). Its usage has been increasing [r] GiB/week. |
| If Fixed | Space usage on Storage Device [x] will decrease by [s] GiB. This will reduce the chance of running out of space to less than [p]%. |
| Destination Storage Device | Space usage on Storage Device [y] will increase by [s'] GiB subsequent to the VM migration. |

Example 2

| | |
|---|---|
| Combined Predicted Metric Type | space_threshold_98 |
| Explanation | Storage Device [x] has a [p]% chance of becoming 98% full within the next week. Once this level has been reached, the Storage Device will not permit any further snapshots to be taken. |
| Backup data | Storage Device [x] is currently [q]% full ([s] TiB). Its usage has been increasing [r] GiB/week. |
| If fixed | Space usage on Storage Device [x] will decrease by [s] GiB. This will reduce the chance of missing snapshots to less than [p]% |
| Destination Storage Device | Space usage on Storage Device [y] will increase by [s'] GiB subsequent to the VM migration. |
| If violated | Space usage on Storage Device [x] will increase by [s] GiB. This will increase the chance of missing snapshot to [p]% |

Example 3

| | |
|---|---|
| Combined Predicted Metric Type | space_threshold_95 |
| Explanation | Storage Device [x] has a [p]% chance of becoming 95% full within the next week. Once this level has been reached, the Storage Device will not accept any additional replicated data. |
| Backup data | Storage Device [x] is currently [q]% full ([s] TiB). Its usage has been increasing [r] GiB/week. |
| If fixed | Space usage on Storage Device [x] will decrease by [s] GiB. This will reduce the chance of stopping replication to less than [p]% |
| Destination Storage Device | Space usage on Storage Device [y] will increase by [s'] GiB. |
| If violated | Space usage on Storage Device [x] will increase by [s] GiB. This will increase the chance of stopping replication to [p]% |

Example 4

| | |
|---|---|
| Combined Predicted Metric Type | space_threshold_90 |
| Explanation | Storage Device [x] has a [p]% chance of becoming 90% full within the next week. This level will trigger a capacity alert on the Storage Device. |
| Backup data | Storage Device [x] is currently [q]% full ([s] TiB). Its usage has been increasing [r] GiB/week. |
| If fixed | Space usage on Storage Device [x] will decrease by [s] GiB. This will reduce the chance of triggering an alert threshold [p]% |
| Destination Storage Device | Space usage on Storage Device [y] will increase by [s'] GiB. |
| If violated | Space usage on Storage Device [x] will increase by [s] GiB. This will increase the chance of a capacity alert to [p]%. |

Example 5

| | |
|---|---|
| Combined Predicted Metric Type | protection_policy_violated |
| Explanation | n/a |
| Backup data | n/a |
| If fixed | n/a |
| If violated | [n] VMs moved to Storage Device [x] will no longer be able to replicate to their configured replication destination. |

Example 6

| | |
|---|---|
| Combined Predicted Metric Type | flash_overcommit_97, flash_overcommit_99 |
| Explanation | Storage Device [x] has experienced high latency this week, due to an average [p]% flash hit rate, which is below our 99% goal. |
| Backup data | Storage Device [x]'s miss rate ranged from [p]% to [q]%. During periods of high miss rate, VMs experienced [m] ms increased latency. |
| If fixed | Flash hit rate will increase to an average of [p]%, reducing latency due to disk reads by [m] ms. |
| If violated | The average flash hit rate on Storage Device [x] will decrease to [p]%, increasing latency by about [m] ms. |

Another way of presenting recommendations is to group recommendations per-storage device instead of as a list of issues and outcomes, such as shown in Examples 1 through 6, above. The way in which the list of VMs is shown may not be altered based on the reasons for moving them, although there could be a column showing "space," "load," "flash," etc. as the reason for their movement.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  obtain aggregated effective historical space usage data associated with a plurality of VMs at a storage device, including to:
   determine that a VM has been added to the storage device; and
   determine the aggregated effective historical space usage data based at least in part on historical space usage data associated with the VM obtained from a source storage device associated with the VM, including to:
    determine that data associated with the VM that has been added to the storage device has been received;
    determine that the data comprises a portion of a plurality of portions of the VM;
    generate a projected historical set of space usage data associated with the portion of the VM based at least in part on the historical space usage data associated with the VM obtained from the source storage device associated with the VM, including to:
     obtain a plurality of most recent historical space usage values corresponding to the plurality of portions of the VM from corresponding respective ones of a plurality of source storage devices;
     obtain a plurality of aggregated historical space usage values corresponding to the VM across the plurality of source storage devices;
     obtain a plurality of time periods during which the VM resided at respective ones of the plurality of source storage devices; and
     determine the projected historical set of space usage data associated with the portion of the VM based at least in part on the plurality of most recent historical space usage values, the plurality of aggregated historical space usage values, and the plurality of time periods;
    determine an expansion factor associated with the data associated with the VM;
    modify the projected historical set of space usage data based at least in part on the expansion factor; and
    determine the aggregated effective historical space usage data based at least in part on adding the modified projected historical set of space usage data to historical space usage data stored at the storage device;
  use the aggregated effective historical space usage data to generate one or more predicted metrics of space usage at the storage device; and
  use the one or more predicted metrics of space usage to potentially migrate the VM with respect to the storage device; and
 a memory coupled to the processor and configured to provide the processor with instructions.

2. The system of claim 1, wherein to determine the expansion factor associated with the data associated with the VM comprises to:
 determine whether the VM has one or more snapshots stored at the source storage device;
 determine whether the VM was a clone at the source storage device; and
 determine a ratio between an original space savings factor associated with the source storage device and a predicted space savings factor associated with the storage device.

3. The system of claim 1, wherein the VM comprises a first VM, and wherein to obtain the aggregated effective historical space usage data associated with the plurality of VMs at the storage device comprises to:
 determine that a second VM has been migrated from the storage device;
 obtain measured historical space usage data associated with the second VM that is stored at the storage device; and
 determine the aggregated effective historical space usage data based at least in part on subtracting the measured historical space usage data associated with the second VM from the historical space usage data stored at the storage device.

4. The system of claim 1, wherein to use the aggregated effective historical space usage data to generate the one or more predicted metrics of space usage at the storage device comprises to:
 input at least a portion of the aggregated effective historical space usage data of the storage device into each of one or more statistical models to generate a plurality of predictions of space usage at the storage device; and
 determine a corresponding portion of the plurality of predictions of space usage that exceeds a threshold value corresponding to a space usage related metric type to determine a predicted space usage metric associated with the space usage related metric type.

5. The system of claim 4, wherein the one or more statistical models comprises one or more of the following: a Monte Carlo simulation and a linear regression.

6. A method, comprising:
 obtaining aggregated effective historical space usage data associated with a plurality of VMs at a storage device, including:
  determining that a VM has been added to the storage device; and
  determining the aggregated effective historical space usage data based at least in part on historical space usage data associated with the VM obtained from a source storage device associated with the VM, including:
   determining that data associated with the VM that has been added to the storage device has been received;
   determining that the data comprises a portion of a plurality of portions of the VM;
   generating a projected historical set of space usage data associated with the portion of the VM based at least in part on the historical space usage data associated with the VM obtained from the source storage device associated with the VM, including:
    obtaining a plurality of most recent historical space usage values corresponding to the plurality of portions of the VM from corresponding respective ones of a plurality of source storage devices;

obtaining a plurality of aggregated historical space usage values corresponding to the VM across the plurality of source storage devices;

obtaining a plurality of time periods during which the VM resided at respective ones of the plurality of source storage devices; and determining the projected historical set of space usage data associated with the portion of the VM based at least in part on the plurality of most recent historical space usage values, the plurality of aggregated historical space usage values, and the plurality of time periods;

determining an expansion factor associated with the data associated with the VM;

modifying the projected historical set of space usage data based at least in part on the expansion factor; and determining the aggregated effective historical space usage data based at least in part on adding the modified projected historical set of space usage data to historical space usage data stored at the storage device;

using the aggregated effective historical space usage data to generate one or more predicted metrics of space usage at the storage device; and using the one or more predicted metrics of space usage to potentially migrate the VM with respect to the storage device.

7. The method of claim 6, wherein determining the expansion factor associated with the data associated with the VM comprises:

determining whether the VM has one or more snapshots stored at the source storage device;

determining whether the VM was a clone at the source storage device; and determining a ratio between an original space savings factor associated with the source storage device and a predicted space savings factor associated with the storage device.

8. The method of claim 6, wherein the VM comprises a first VM, and wherein obtaining the aggregated effective historical space usage data associated with the plurality of VMs at the storage device comprises:

determining that a second VM has been migrated from the storage device;

obtaining measured historical space usage data associated with the second VM that is stored at the storage device; and determining the aggregated effective historical space usage data based at least in part on subtracting the measured historical space usage data associated with the second VM from the historical space usage data stored at the storage device.

9. The method of claim 6, wherein using the aggregated effective historical space usage data to generate the one or more predicted metrics of space usage at the storage device comprises:

inputting at least a portion of the aggregated effective historical space usage data of the storage device into each of one or more statistical models to generate a plurality of predictions of space usage at the storage device; and determining a corresponding portion of the plurality of predictions of space usage that exceeds a threshold value corresponding to a space usage related metric type to determine a predicted space usage metric associated with the space usage related metric type.

10. The method of claim 9, wherein the one or more statistical models comprises one or more of the following: a Monte Carlo simulation and a linear regression.

11. A computer program product, the computer program product being embodied in a non-transitory computer readable storage medium and comprising computer instructions for:

obtaining aggregated effective historical space usage data associated with a plurality of VMs at a storage device, including:

determining that a VM has been added to the storage device; and determining the aggregated effective historical space usage data based at least in part on historical space usage data associated with the VM obtained from a source storage device associated with the VM, including:

determining that data associated with the VM that has been added to the storage device has been received;

determining that the data comprises a portion of a plurality of portions of the VM;

generating a projected historical set of space usage data associated with the portion of the VM based at least in part on the historical space usage data associated with the VM obtained from the source storage device associated with the VM, including:

obtaining a plurality of most recent historical space usage values corresponding to the plurality of portions of the VM from corresponding respective ones of a plurality of source storage devices;

obtaining a plurality of aggregated historical space usage values corresponding to the VM across the plurality of source storage devices;

obtaining a plurality of time periods during which the VM resided at respective ones of the plurality of source storage devices; and determining the projected historical set of space usage data associated with the portion of the VM based at least in part on the plurality of most recent historical space usage values, the plurality of aggregated historical space usage values, and the plurality of time periods;

determining an expansion factor associated with the data associated with the VM;

modifying the projected historical set of space usage data based at least in part on the expansion factor; and determining the aggregated effective historical space usage data based at least in part on adding the modified projected historical set of space usage data to historical space usage data stored at the storage device;

using the aggregated effective historical space usage data to generate one or more predicted metrics of space usage at the storage device; and using the one or more predicted metrics of space usage to potentially migrate the VM with respect to the storage device.

12. The computer program product of claim 11, wherein determining the expansion factor associated with the data associated with the VM comprises:

determining whether the VM has one or more snapshots stored at the source storage device;

determining whether the VM was a clone at the source storage device; and determining a ratio between an original space savings factor associated with the source storage device and a predicted space savings factor associated with the storage device.

13. The computer program product of claim 11, wherein the VM comprises a first VM, and wherein obtaining the aggregated effective historical space usage data associated with the plurality of VMs at the storage device comprises:

determining that a second VM has been migrated from the storage device;

obtaining measured historical space usage data associated with the second VM that is stored at the storage device; and determining the aggregated effective historical space usage data based at least in part on subtracting the measured historical space usage data associated with the second VM from the historical space usage data stored at the storage device.

14. The computer program product of claim 11, wherein using the aggregated effective historical space usage data to generate the one or more predicted metrics of space usage at the storage device comprises:

inputting at least a portion of the aggregated effective historical space usage data of the storage device into each of one or more statistical models to generate a plurality of predictions of space usage at the storage device; and determining a corresponding portion of the plurality of predictions of space usage that exceeds a threshold value corresponding to a space usage related metric type to determine a predicted space usage metric associated with the space usage related metric type.

15. The computer program product of claim 14, wherein the one or more statistical models comprises one or more of the following: a Monte Carlo simulation and a linear regression.

* * * * *

UNITED STATES PATENT AND TRADEMARK OFFICE
CERTIFICATE OF CORRECTION

Page 1 of 1

PATENT NO. : 10,509,667 B1
APPLICATION NO. : 15/693249
DATED : December 17, 2019
INVENTOR(S) : Siva Popuri and Mark G. Gritter It is certified that error appears in the above-identified patent and that said Letters Patent is hereby corrected as shown below:

In the Specification

In Column 29, Line(s) 4, delete "sum(*i)" and insert --sum(i*i)--, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*